US012613133B2

(12) United States Patent
Ikeda

(10) Patent No.: US 12,613,133 B2
(45) Date of Patent: Apr. 28, 2026

(54) INSPECTION TOOL AND INSPECTION METHOD

(71) Applicant: FUJIFILM Corporation, Tokyo (JP)

(72) Inventor: Kimi Ikeda, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 217 days.

(21) Appl. No.: 18/639,944

(22) Filed: Apr. 18, 2024

(65) Prior Publication Data

US 2024/0280405 A1 Aug. 22, 2024

Related U.S. Application Data

(63) Continuation of application No. PCT/JP2022/039420, filed on Oct. 24, 2022.

(30) Foreign Application Priority Data

Nov. 5, 2021 (JP) ................................ 2021-180938

(51) Int. Cl.
*G01J 1/50* (2006.01)

(52) U.S. Cl.
CPC ...................................... *G01J 1/50* (2013.01)

(58) Field of Classification Search
CPC ........................................................ G01J 1/50
See application file for complete search history.

(56) References Cited

U.S. PATENT DOCUMENTS 6,437,346 B1 8/2002 Goudjil
10,113,907 B2 10/2018 Hatta et al.
(Continued)

FOREIGN PATENT DOCUMENTS

GB 2239150 A * 6/1991 ............... G01J 1/50
JP H0843197 2/1996
(Continued)

OTHER PUBLICATIONS

"International Search Report (Form PCT/ISA/210) of PCT/JP2022/039420," mailed on Nov. 29, 2022, with English translation thereof, pp. 1-5.
(Continued)

*Primary Examiner* — Casey Bryant
(74) *Attorney, Agent, or Firm* — JCIPRNET

(57) ABSTRACT

The present invention provides an inspection tool and an inspection method, with which it is possible to easily discriminate whether or not irradiation with light having a wavelength of 222 nm and light having a wavelength of 254 nm is performed even under sunlight. The inspection tool of the present invention includes a sensing portion and a reference portion, in which the sensing portion includes a sensing layer which senses at least light having a wavelength of 200 to 254 nm, the reference portion includes the sensing layer and a transparent layer, and the transparent layer satisfies a relationship of Expressions (1) and (2), $$0\% \leq TMA_{200\ to\ 254} < 15.0\% \quad \text{Expression (1)}$$

$$50.0\% < TMI_{360\ to\ 800} \leq 100\% \quad \text{Expression (2)}$$

in Expression (1), $TMA_{200\ to\ 254}$ represents a maximum transmittance of the transparent layer in a wavelength range of 200 to 254 nm.

in Expression (2), $TMI_{360\ to\ 800}$ represents a minimum transmittance of the transparent layer in a wavelength range of 360 to 800 nm.

20 Claims, 3 Drawing Sheets

(56) References Cited

U.S. PATENT DOCUMENTS

| | | | | |
|---|---|---|---|---|
| 2010/0187426 | A1* | 7/2010 | Young .................. | G01J 1/0209 250/370.07 |
| 2015/0343102 | A1 | 12/2015 | Romo et al. | |
| 2019/0321499 | A1 | 10/2019 | Igarashi | |
| 2023/0392981 | A1 | 12/2023 | Ikeda et al. | |

FOREIGN PATENT DOCUMENTS

| | | |
|---|---|---|
| JP | 3024525 | 5/1996 |
| JP | 2002122476 | 4/2002 |
| JP | 2007278904 | 10/2007 |
| JP | 2015191001 | 11/2015 |
| JP | 2017524393 | 8/2017 |
| JP | 2019187727 | 10/2019 |
| JP | 2022170959 | 11/2022 |
| WO | 2016017701 | 2/2016 |
| WO | 2017158943 | 9/2017 |
| WO | 2022181288 | 9/2022 |

OTHER PUBLICATIONS

"Written Opinion of the International Searching Authority (Form PCT/ISA/237) of PCT/JP2022/039420," mailed on Nov. 29, 2022, with English translation thereof, pp. 1-8.

Hiroki Kitagawa et al., "Effectiveness of 222-nm ultraviolet light on disinfecting SARS-CoV-2 surface contamination", American Journal of Infection Control, Mar. 2021, pp. 299-301.

* cited by examiner

INSPECTION TOOL AND INSPECTION METHOD

CROSS-REFERENCE TO RELATED APPLICATIONS

This application is a Continuation of PCT International Application No. PCT/JP2022/039420 filed on Oct. 24, 2022, which claims priority under 35 U.S.C. § 119(a) to Japanese Patent Application No. 2021-180938 filed on Nov. 5, 2021. The above applications are hereby expressly incorporated by reference, in their entirety, into the present application.

BACKGROUND OF THE INVENTION

1. Field of the Invention

The present invention relates to an inspection tool and an inspection method.

2. Description of the Related Art

A measurement of an amount of ultraviolet irradiation has been carried out in various fields. Specific examples thereof include a measurement of an amount of ultraviolet irradiation to an object to be irradiated in a curing reaction of an ultraviolet curing resin, and a measurement of an amount of ultraviolet irradiation to an object to be irradiated in an ultraviolet sterilization of food or the like.

As the measurement of the amount of ultraviolet irradiation, for example, JP2015-191001A discloses a method of using "UV label" (UV-H manufactured by NiGK Corporation), and WO2017/158943A discloses a method of using "UV scale" (manufactured by FUJIFILM Corporation).

In addition, WO2016/017701A discloses an ultraviolet-sensing sheet including a filter layer which selectively transmits light having a specific wavelength, and an ultraviolet-sensing layer containing a capsule encapsulating a color-developing dye and a photooxidant.

In addition, JP3024525Y discloses a display device including a sensitive material layer in which one or a plurality of sensitive materials having a property of changing color in response to an irradiation amount of ultraviolet rays in a specific wavelength range are formed in a parallel and stepwise manner in which the property is strong, and a filter material layer in which a plurality of filter materials having an effect of adjusting a transmission amount of light are formed in a parallel and stepwise manner in which the effect is strong.

On the other hand, in recent years, infection with novel coronavirus (COVID-19) has been a major social problem.

Under these circumstances, in Hiroki, Kitagawa et al., "Effectiveness of 222-nm ultraviolet light on disinfecting SARS-COV-2 surface contamination", American Journal of Infection Control, Internet (https://www.sciencedirect.com/science/article/pii/S0196655320308099), an inactivation effect of the novel coronavirus using ultraviolet rays with a wavelength of 222 nm has been reported. More specifically, in Hiroki, Kitagawa et al., "Effectiveness of 222-nm ultraviolet light on disinfecting SARS-COV-2 surface contamination", American Journal of Infection Control, Internet (https://www.sciencedirect.com/science/article/pii/S0196655320308099), it has been reported that 99.7% of the novel coronavirus is inactivated by radiating ultraviolet rays with a wavelength of 222 nm at an illuminance of 0.1 $mW/cm^2$ for 30 seconds.

SUMMARY OF THE INVENTION

As disclosed in Hiroki, Kitagawa et al., "Effectiveness of 222-nm ultraviolet light on disinfecting SARS-COV-2 surface contamination", American Journal of Infection Control, Internet (https://www.sciencedirect.com/science/article/pii/S0196655320308099), since ultraviolet rays with a wavelength of 222 nm are effective in inactivating the novel coronavirus, for example, by radiating ultraviolet rays with a wavelength of 222 nm to a member which is touched by an unspecified number of people, such as a doorknob and a touch panel, it is possible to prevent the infection with the novel coronavirus. It has been known that ultraviolet rays having a wavelength of 254 nm are also effective in inactivating the novel coronavirus, in addition to the ultraviolet rays having a wavelength of 222 nm.

Therefore, there has been a demand for an inspection tool capable of easily measuring whether or not light having a wavelength of 222 nm and light having a wavelength of 254 nm are emitted.

In a case of measuring whether or not light having a wavelength of 222 nm and light having a wavelength of 254 nm are emitted using the "UV label" and the "UV scale" known in the related art, which are disclosed in JP2015-191001A and WO2017/158943A, the present inventor has found that the measurement cannot be appropriately performed due to influence of sunlight. Specifically, in a case of using the "UV label" and the "UV scale" known in the related art in an environment in which sunlight is incident through a window or the like, such as an indoor environment, to measure whether or not the light having a wavelength of 222 nm and the light having a wavelength of 254 nm are emitted, the "UV label" and the "UV scale" may also develop color due to the sunlight, so that it may be impossible to discriminate whether or not the color is developed by the sunlight or by the irradiation with the light having a wavelength of 222 nm and the light having a wavelength of 254 nm.

In general, ultraviolet rays having a wavelength of 300 nm or less are hardly included in the sunlight irradiated on the ground due to absorption of the ultraviolet rays by an ozone layer.

In the related art, for example, WO2016/017701A and JP3024525Y disclose a technique of controlling a photosensitive property of a sensing layer by disposing a filter layer.

In a case where, with reference to WO2016/017701A and JP3024525Y, the filter layer disclosed in WO2016/017701A and the filter layer disclosed in JP3024525Y, which is made of a transparent material such as glass and plastics, for example, polyethylene, are arranged on the entire surface of the sensing layer which senses the light having a wavelength of 222 nm and the light having a wavelength of 254 nm to develop color, and then characteristics thereof are evaluated, the present inventors have found that it is not possible to obtain a desired effect. More specifically, as shown in FIG. 7, in a case where a filter layer 102 as disclosed in WO2016/017701A is provided on a sensing layer 100, and sunlight (black arrow in FIG. 7) reaching the sensing layer 100 is shielded by the filter layer 102, since these materials also absorb and shield light having a wavelength of 222 nm and light having a wavelength of 254 nm (white arrow in FIG. 7), it has been found that the light having a wavelength of 222 nm and the light having a wavelength of 254 nm, which reach the sensing layer 100, are reduced, and it is difficult for the sensing layer 100 to develop color. In addition, in a case where a plastic film such as polyethylene, as disclosed in JP3024525Y, is used as the filter layer 102 shown in FIG. 7, since the filter layer 102 does not sufficiently shield the sunlight, it has been found that the influence of the sunlight cannot be excluded in the first place.

As described above, the organic materials, inorganic materials, and the like, which can shield the sunlight including light having a wavelength of 300 nm or more, usually have an absorption in a wavelength of 300 nm or less from their chemical structures, and thus it is difficult to both suppress the influence of the sunlight and achieve favorable photosensitivity to the light having a wavelength of 222 nm and the light having a wavelength of 254 nm.

In view of the above-described circumstances, an object of the present invention is to provide an inspection tool with which it is possible to easily discriminate whether or not irradiation with light having a wavelength of 222 nm and light having a wavelength of 254 nm is performed even under sunlight.

Another object of the present invention is to provide an inspection method.

As a result of intensive studies to achieve the above-described objects, the present inventors have found that the above-described objects can be achieved by the following configurations, and have completed the present invention.

(1) An inspection tool comprising:

a sensing portion; and a reference portion, in which the sensing portion includes a sensing layer which senses at least light having a wavelength of 200 to 254 nm, the reference portion includes the sensing layer and a transparent layer, and the transparent layer satisfies a relationship of Expressions (1) and (2) described later.

(2) The inspection tool according to (1), in which the inspection tool has a sheet shape.

(3) The inspection tool according to (1) or (2), in which the transparent layer is a resin layer.

(4) The inspection tool according to any one of (1) to (3), in which the transparent layer contains a resin selected from the group consisting of an aromatic polyester, a polystyrene, a (meth)acrylic resin, an aromatic polyurethane, an aromatic polyurethane urea, and an aromatic polyurea.

(5) The inspection tool according to any one of (1) to (3), in which the transparent layer contains an ultraviolet-C absorber and a resin, and the resin includes a resin selected from the group consisting of an aromatic polyester, a polystyrene, a (meth) acrylic resin, an aromatic polyurethane, an aromatic polyurethane urea, an aromatic polyurea, a polyolefin, a polyacetyl cellulose, a cellulose resin, a polyvinylpyrrolidone, a polyvinyl alcohol, a polyvinyl butyral, a polyvinyl chloride, and a polyacetoacetate.

(6) The inspection tool according to any one of (1) to (5), in which the transparent layer satisfies at least one of a requirement A or a requirement B, which will be described later.

(7) The inspection tool according to any one of (1) to (6), in which, in a case where, using a KrCl excimer lamp as a light source, the sensing portion is irradiated with light through a filter which substantially shields light having a wavelength of 230 to 300 nm until an irradiation amount of light having a wavelength of 222 nm reaches 5 $mJ/cm^2$, a color difference $\Delta E$ between before the light irradiation and after the light irradiation is 20.0 or more.

(8) The inspection tool according to any one of (1) to (7), in which the sensing layer contains a color-developing agent and a photoactivator.

(9) The inspection tool according to (8), in which the color-developing agent includes any one structure selected from the group consisting of a lactone ring, a lactam ring, a sultone ring, a sultine ring, a ring-opened body of these rings, and an azobenzene structure.

(10) The inspection tool according to (8) or (9), in which the sensing layer contains a compound represented by General Formula (6) described later.

(11) An inspection method using the inspection tool according to any one of (1) to (10).

According to the present invention, it is possible to provide an inspection tool with which it is possible to easily discriminate whether or not irradiation with light having a wavelength of 222 nm and light having a wavelength of 254 nm is performed even under sunlight.

In addition, according to the present invention, it is possible to provide an inspection method.

DESCRIPTION OF THE PREFERRED EMBODIMENTS

Hereinafter, the present invention will be described in detail.

The description of the configuration requirements described below is made on the basis of representative embodiments of the present invention, but it should not be construed that the present invention is limited to those embodiments.

In the present specification, the numerical ranges shown using "to" indicate ranges including the numerical values described before and after "to" as the lower limit value and the upper limit value.

In addition, regarding numerical ranges that are described stepwise in the present specification, an upper limit value or a lower limit value described in a numerical range may be replaced with an upper limit value or a lower limit value of another stepwise numerical range. In addition, in the numerical range described in the present specification, an upper limit value and a lower limit value described in a certain numerical range may be replaced with values shown in Examples.

In addition, in the present specification, a solid content means a component forming a composition layer formed of a composition, and in a case where the composition contains a solvent (for example, organic solvent, water, and the like), the solid content means all components excluding the solvent. In addition, in a case where the components are components which form a composition layer, the components are considered to be solid contents even in a case where the components are liquid components.

In addition, in the present specification, ultraviolet rays mean light having a wavelength range of 10 to 400 nm.

In addition, in the present specification, (meth)acrylic means "at least one of acrylic or methacrylic".

Figure 1:
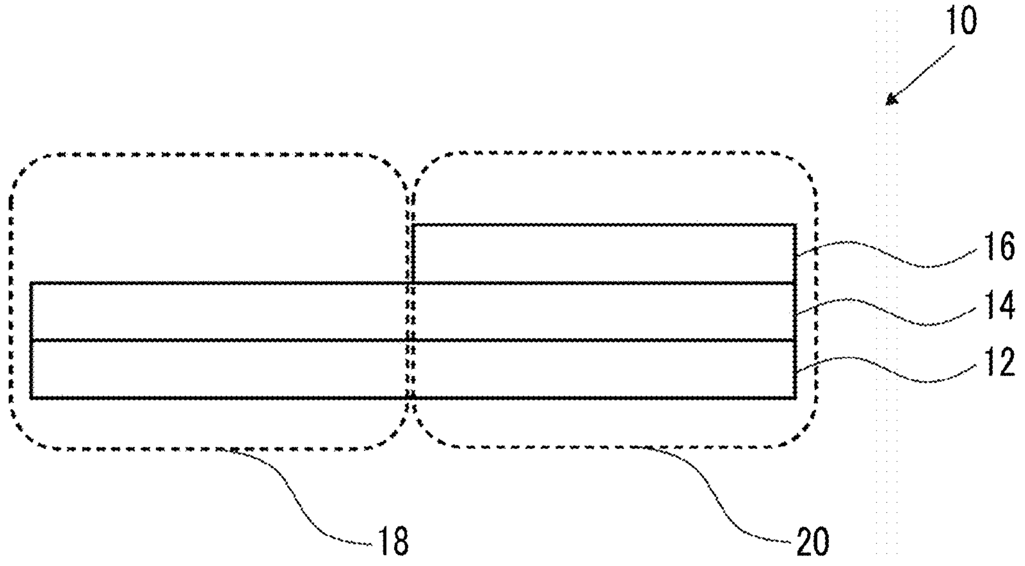
FIG. 1 is a schematic cross-sectional view showing an example of an inspection tool.

FIG. 1 shows an embodiment of the inspection tool according to the present invention.

FIG. 1 is a schematic cross-sectional view showing an example of the inspection tool. As shown in FIG. 1, an inspection tool 10 includes a support 12, a sensing layer 14, and a transparent layer 16 in this order. The transparent layer 16 is disposed in a part of a region of a surface of the sensing layer 14 on a side opposite to the support 12 side. That is, the transparent layer 16 is disposed to cover a part of the region on the surface of the sensing layer 14. In FIG. 1, a sensing portion 18 is composed of a part of the support 12 and a part of the sensing layer 14, and a reference portion 20 is composed of the remaining part of the support 12, the remaining part of the sensing layer 14, and the transparent layer 16. That is, in the reference portion 20, the sensing layer 14 and the transparent layer 16 are laminated along a thickness direction.

In FIG. 1, the transparent layer 16 is disposed so as to be in contact with the sensing layer 14, but the present invention is not limited to this aspect. Another layer (for example, a pressure-sensitive adhesive layer or an adhesive layer) may be disposed between the transparent layer 16 and the sensing layer 14.

Hereinafter, a case where the inspection tool 10 shown in FIG. 1 is irradiated with light having a wavelength of 222 nm in an environment in which the inspection tool 10 is irradiated with sunlight will be described. Here, a case where the sensing layer 14 is exposed to both the light having a wavelength of 222 nm and the sunlight will be described as an example.

Figure 2:
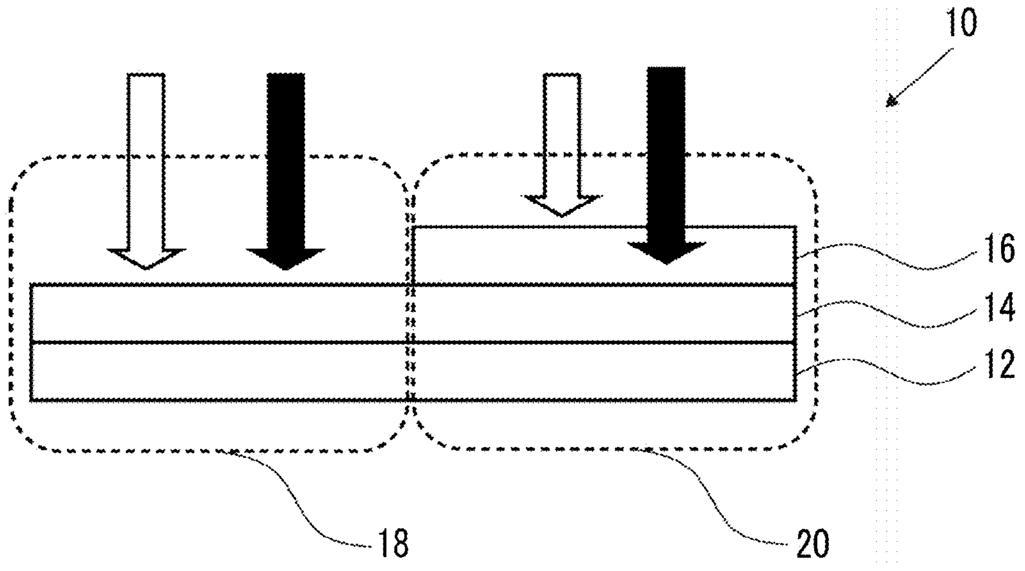
FIG. 2 is a view for describing a case where light having a wavelength of 222 nm and sunlight are emitted to the inspection tool.

As shown by a white arrow in FIG. 2, the inspection tool 10 is irradiated with the light having a wavelength of 222 nm from a side where the transparent layer 16 is disposed. The inspection tool 10 is irradiated with the sunlight from a side where the transparent layer 16 is disposed, as shown by a black arrow.

In the sensing portion 18 of the inspection tool 10, as shown in FIG. 2, the light having a wavelength of 222 nm and the sunlight are emitted, the sensing layer 14 in the sensing portion 18 is exposed to light to develop color. That is, the sensing layer 14 in the sensing portion 18 is exposed to the light having a wavelength of 222 nm and the sunlight to develop color.

On the other hand, in the reference portion 20 where the sensing layer 14 covered with the transparent layer 16 of the inspection tool 10 is provided, as shown in FIG. 2, the light having a wavelength of 222 nm and the sunlight are emitted, but the light having a wavelength of 222 nm is shielded by the transparent layer 16 satisfying a relationship of Expression (1) described later, which indicates that a transmittance of light in a wavelength range of 200 to 254 nm is low, and the light having a wavelength of 222 nm does not reach the sensing layer 14. On the other hand, as described above, ultraviolet rays having a wavelength of 300 nm or less are hardly included in the sunlight irradiated on the ground due to absorption of the ultraviolet rays by an ozone layer. Therefore, the sunlight reaches the sensing layer 14 without being shielded by the transparent layer 16 satisfying a relationship of Expression (2), which indicates that the transparent layer 16 easily transmits light on the long wavelength side of ultraviolet rays, visible light, and the like. Accordingly, the sensing layer 14 in the reference portion 20 is exposed to the sunlight to develop color.

Figure 3:
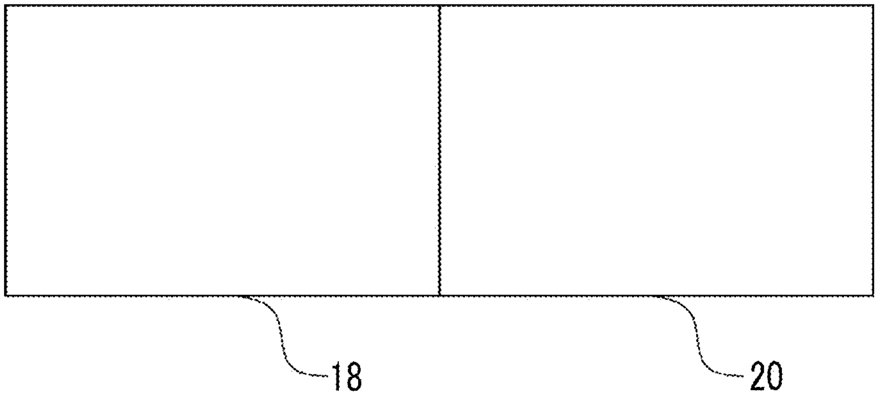
FIG. 3 is a plan view of the inspection tool before being irradiated with the light having a wavelength of 222 nm and the sunlight.
Figure 4:
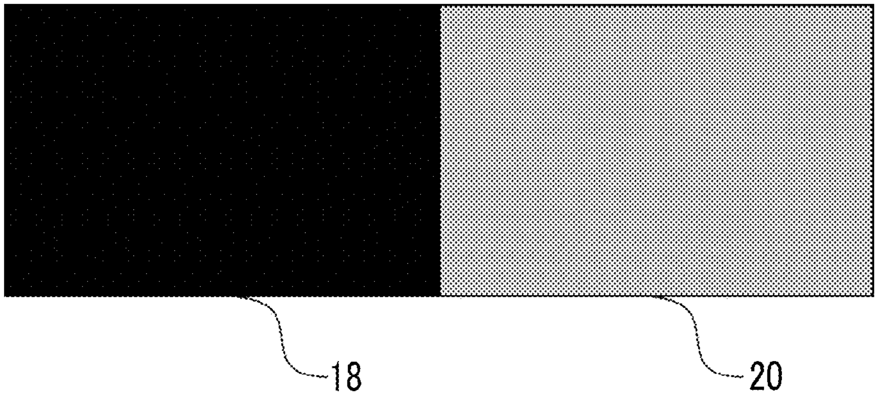
FIG. 4 is a plan view of the inspection tool after being irradiated with the light having a wavelength of 222 nm and the sunlight.

As described above, the sensing layer 14 in the sensing portion 18 of the inspection tool 10 is exposed to the light having a wavelength of 222 nm and the sunlight, whereas the sensing layer 14 in the reference portion 20 of the inspection tool 10 is exposed to the sunlight. Therefore, in a case where a state of the sensing layer 14 before being exposed to light is white and a state of the sensing layer 14 being exposed to light is black, first, when the inspection tool 10 is visually recognized from a normal direction before being irradiated with the light having a wavelength of 222 nm and the sunlight, as shown in FIG. 3, both the sensing portion 18 and the reference portion 20 of the inspection tool 10 are white. On the other hand, as shown in FIG. 4, in a case where the inspection tool is irradiated with the light having a wavelength of 222 nm and the sunlight as described above, the sensing layer 14 in the sensing portion 18 is irradiated with two types of light, that is, the light having a wavelength of 222 nm and the sunlight, and thus the sensing layer 14 in the reference portion 20, which is irradiated with only the sunlight, is changed to be blacker than the sensing layer 14 in the reference portion 20. Therefore, it is possible to easily discriminate whether or not the light having a wavelength of 222 nm has been emitted, by comparing a difference between a tint of the color developed in the sensing layer 14 in the sensing portion 18 and a tint of the color developed in the sensing layer 14 in the reference portion 20.

Figure 5:
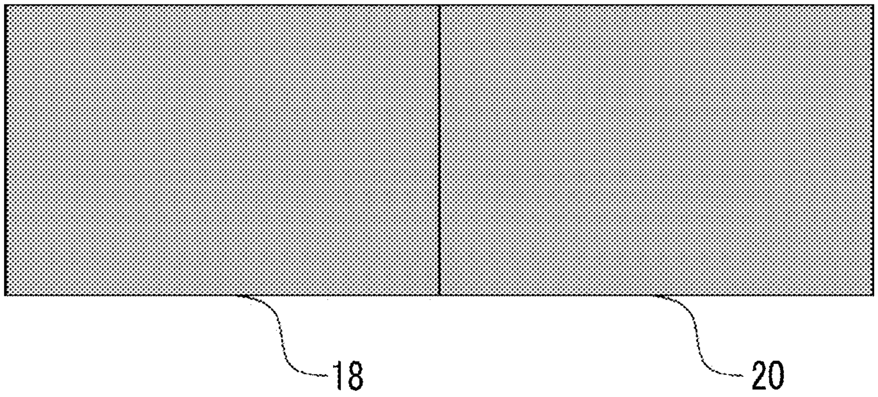
FIG. 5 is a plan view of the inspection tool after being irradiated with only the sunlight.

In a case where only the sunlight is emitted to the inspection tool 10 shown in FIG. 1, only the sunlight is emitted to the sensing layer 14 in the sensing portion 18 and the sensing layer 14 in the reference portion 20, and as shown in FIG. 5, the tint of the color developed in the sensing layer 14 in the sensing portion 18 is the same as the tint of the color developed in the sensing layer 14 in the reference portion 20, so that it can be determined that the light having a wavelength of 222 nm is not emitted.

As described above, in the related art, the filter layer is disposed so as not to be exposed to the sunlight, which is a technical concept of disposing the filter layer so that the sensing layer is not exposed to the sunlight. On the other hand, in the inspection tool according to the embodiment of the present invention, the transparent layer is disposed so as to transmit the sunlight and shield the light having a wavelength of 222 nm, which is the detection target, which is a technical concept based on a completely different concept from the related art.

In the inspection tool according to the embodiment of the present invention, as described above, the presence or absence of the irradiation with the light having a wavelength of 222 nm and the light having a wavelength of 254 nm can be easily determined even in a situation in which the external factor due to the sunlight has an influence, and the presence or absence of the influence due to the external factor can also be discriminated.

For example, in a case where the inspection tool according to the embodiment of the present invention is stored for a predetermined period of time, a tint of the inspection tool itself may change from immediately after the manufacture due to a thermal influence. Even in such a case, when the inspection tool is irradiated with light having a wavelength of at least one of 222 nm or 254 nm, the sensing layer in the sensing portion is exposed to light, and the tint or the like is further changed. Even in a case where the sensing layer in the reference portion is irradiated with the light having a wavelength of 222 nm and the light having a wavelength of 254 nm, since the transparent layer shields the lights, the change in tint does not occur. Therefore, even in a case where the tint of the entire inspection tool changes after the inspection tool according to the embodiment of the present invention is stored for a predetermined period, the tint of the sensing layer in the sensing portion after the irradiation with at least one of the light having a wavelength of 222 nm or the light having a wavelength of 254 nm is different from the tint of the sensing layer in the reference portion, so that the presence or absence of the irradiation with the light having a wavelength of 222 nm and the light having a wavelength of 254 nm can be easily determined.

In FIGS. 1 to 5 described above, a case where a visual change from white to black occurs in a case where the sensing layer is exposed to light has been described, but the present invention is not limited to this aspect, and another aspect in which a change to another color occurs may be adopted.

Figure 6:
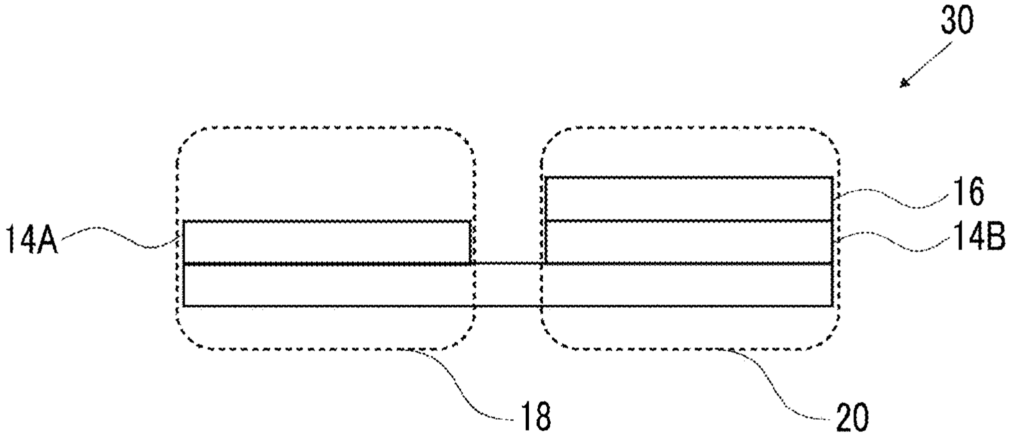
FIG. 6 is a view showing another aspect of the inspection tool.
Figure 7:
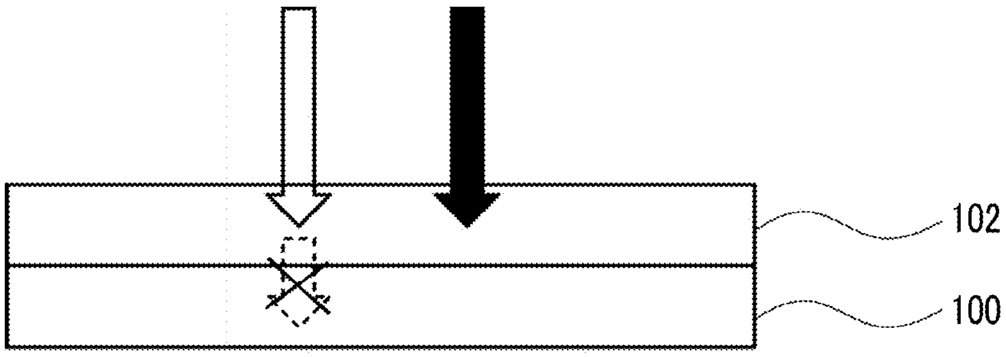
FIG. 7 is a view for describing the related art.

In addition, in FIG. 1, the sensing layer 14 in the sensing portion 18 and the sensing layer 14 in the reference portion 20 are configured of the same layer, but the present invention is not limited to this aspect, and for example, as shown in FIG. 6, a sensing layer 14A in the sensing portion 18 and a sensing layer 14B in the reference portion 20 may be separated from each other.

Hereinafter, each member of the inspection tool will be described in detail.

<Support>

The support is a member which supports the sensing layer, the transparent layer, and the like, and is an arbitrary member.

Examples of the support include a resin sheet, paper (including synthetic paper), cloth (including woven fabric and nonwoven fabric), glass, wood, and metal. As the support, a resin sheet or paper is preferable, a resin sheet or synthetic paper is more preferable, and a resin sheet is still more preferable.

Examples of a material of the resin sheet include a polyethylene resin, a polypropylene resin, a cyclic polyolefin resin, a polystyrene resin, an acrylonitrile-styrene copolymer, an acrylonitrile-butadiene-styrene copolymer, a polyvinyl chloride resin, a fluororesin, a (meth)acrylic resin, a polycarbonate resin, a polyester resin (for example, polyethylene terephthalate, polyethylene naphthalate, and the like), a polyamide resin such as nylon, a polyimide resin, a polyamide-imide resin, a polyaryl phthalate resin, a silicone resin, a polysulfone resin, a polyphenylene sulfide resin, a polyethersulfone resin, a polyurethane resin, an acetal resin, and a cellulose resin.

Examples of the synthetic paper include paper in which many microvoids are formed by biaxially stretching polypropylene or polyethylene terephthalate (for example, YUPO and the like); paper produced from synthetic fibers such as polyethylene, polypropylene, polyethylene terephthalate, and polyamide; and paper in which these papers are laminated on part, one side, or both sides thereof.

In addition, examples of a suitable aspect of the resin sheet include a white resin sheet formed by dispersing a white pigment in a resin. Examples of a material of the resin in the above-described white resin sheet include the same materials as those in the resin sheet described above.

The white resin sheet has ultraviolet reflectivity. Therefore, in a case where the support is the white resin sheet, since ultraviolet rays irradiated to the inspection tool are reflected by the support, it is possible to suppress scattering of the ultraviolet rays inside the inspection tool. As a result, accuracy of detecting the amount of ultraviolet irradiation in the inspection tool can be further improved.

As the white resin sheet and the white pigment, a white resin film and a white pigment described in paragraph 0080 of WO2016/017701 can be referred to, the contents of which are incorporated in the present specification.

As the white resin sheet, for example, a white polyester sheet is preferable, and a white polyethylene terephthalate sheet is more preferable.

Examples of a commercially available product of the white resin sheet include YUPO (manufactured by YUPO Corporation), LUMIRROR (manufactured by Toray Industries Inc.), and CRISPER (manufactured by Toyobo Co., Ltd.).

A thickness of the support is preferably 5 μm or more, more preferably 25 μm or more, and still more preferably 50 μm or more. The upper limit is preferably 1 cm or less, more preferably 2 mm or less, and still more preferably 500 μm or less.

<Sensing Layer>

The inspection tool includes a sensing portion and a reference portion, in which the sensing portion and the reference portion both include a sensing layer. The sensing layer is a layer which senses at least light having a wavelength of 200 to 254 nm. The sensing layer included in the sensing portion and the sensing layer included in the reference portion are layers having the same composition.

The sensing layer is a layer which senses at least light having a wavelength of 200 to 254 nm (hereinafter, also referred to as "specific ultraviolet rays X"), and can be exposed to light having all the wavelengths of 200 to 254 nm. More specifically, the layer which senses the specific ultraviolet rays X is preferably a layer which causes a visual change (for example, "color development" described later) before and after the irradiation with the specific ultraviolet rays X.

As described above, in the inspection tool according to the embodiment of the present invention, even in a case where the sensing layer is affected by the sunlight, it is possible to discriminate whether or not the irradiation with the light having a wavelength of 222 nm and the light having a wavelength of 254 nm is performed, based on the difference in tint between the sensing portion and the reference portion. Therefore, the sensing layer may be a layer which senses light having a wavelength of more than 254 nm. That is, the sensing layer may be a layer which causes a visual change before and after being exposed to the light having a wavelength of more than 254 nm.

Among these, from the viewpoint that it is possible to more easily discriminate whether or not the irradiation with the light having a wavelength of 222 nm and the light having a wavelength of 254 nm is performed even under the sunlight (hereinafter, also simply referred to as "viewpoint that the effect of the present invention is more excellent"), the sensing layer is preferably a layer which senses light having a wavelength of 360 to 400 nm. That is, it is preferable that the sensing layer is a layer which causes a visual change (for example, "color development" described later) before and after irradiation with any light having a wavelength of 360 to 400 nm.

In addition, the sensing layer may sense visible light (light having a wavelength of 400 to 700 nm), or may not sense the visible light.

The sensing layer preferably contains a color-developing agent, and from the viewpoint of further improving the sensitivity to the light having a wavelength of 222 nm and the light having a wavelength of 254 nm, it is more preferable to contain a color-developing agent and a photoactivator.

A main color-developing mechanism in a case where the sensing layer contains the color-developing agent and the photoactivator is presumed as follows. In the following, a case where the photoactivator is activated in both the specific ultraviolet rays X and the sunlight will be described.

The photoactivator absorbs the specific ultraviolet rays X and sunlight and is activated to generate an acid and/or a radical, and the color-developing agent develops color by reaction with this acid and/or radical. In this case, an amount of acid and/or radical generated from the photoactivator varies depending on the irradiation amount of specific ultraviolet rays X and sunlight, and an amount of the color-developing agent which develops color also varies depending on the amount of acid and/or radical generated from the photoactivator. As a result, in the sensing layer, a color optical density is formed in a shade according to the irradiation amount of the irradiated specific ultraviolet rays X and sunlight, and a colored part in which a color optical density occurs according to the irradiation amount of the specific ultraviolet rays X and sunlight is formed.

As described above, in the sensing layer in the sensing portion, both the specific ultraviolet rays X and the sunlight are emitted, whereas in the sensing layer in the reference portion, the specific ultraviolet rays X are shielded by the transparent layer and only the sunlight is emitted, so that the color optical density between the two is different from each other. Therefore, it is easy to discriminate that the specific ultraviolet rays X are emitted.

(Color-Developing Agent)

The color-developing agent means a compound which colors, discolors, or is decolorized.

In addition, the color-developing is a concept including coloration, discoloration, and decolorization. The "coloration" means coloring from a state of being substantially colorless (a state in which it is colorless or exhibits a light color). The "discoloration" means that color changes from a specific colored state to a colored state different from the specific colored state (for example, a change in color from yellow to red). In addition, the "decolorization" means a change from a specific colored state to a state of being substantially colorless (a state in which it is colorless or exhibits a light color).

The type of the color-developing agent is not particularly limited, and examples thereof include a color-developing agent which develops color by being oxidized, a color-developing agent which develops color by action of acid, and a color-developing agent which develops color by action of light. Among these, a color-developing agent which develops color by being oxidized or a color-developing agent which develops color by action of acid is preferable, and a color-developing agent which develops color by action of acid is more preferable.

The color-developing agent may be used alone or in combination of two or more kinds thereof.

The color-developing agent is preferably a color-developing agent including any one structure selected from the group consisting of a lactone ring, a lactam ring, a sultone ring, a sultine ring, a ring-opened body of these rings, and an azobenzene structure.

As the color-developing agent, a leuco coloring agent or a photochromic coloring agent is preferable, and a leuco coloring agent is more preferable.

The photochromic coloring agent is known as a compound which develops color by being isomerized by the action of light, a compound which develops color by progressing a ring-closing reaction by the action of light, a compound which develops color by progressing a ring-opening reaction by the action of light, or the like, and a known photochromic coloring agent can be used. It is preferable that the photochromic coloring agent has a coloring-decolorizing reaction which reversibly proceeds with energy.

The above-described leuco coloring agent is preferably a compound which develops color in a case of being oxidized from a substantially colorless state (hereinafter, also referred to as "oxidative color-developing leuco coloring agent") or a compound which develops color by the action of acid from a substantially colorless state (hereinafter, also referred to as "acid color-developing leuco coloring agent").

Examples of the leuco coloring agent include a triarylmethanephthalide-based compound having a triarylmethane structure and a phthalide structure, a fluoran-based compound having a xanthene structure and a phthalide structure, a phenothiazine-based compound, an indolylphthalide-based compound having an indolyl structure and a phthalide structure, an azaindolylphthalide-based compound having an azaindolyl structure and a phthalide structure, a leucoauramine-based compound, a rhodamine lactam-based compound having a xanthene structure and a lactam structure, a triarylmethane-based compound, a diarylmethane-based compound, a triazene-based compound, a spiropyran-based compound, a thiazine compound, and a fluorene-based compound.

For details of the above-described compounds, reference can be made to the description of U.S. Pat. No. 3,445,234A, JP1993-257272A (JP-H5-257272A), and paragraphs 0029 to 0034 of WO2009/008248A.

Oxidative Color-Developing Leuco Coloring Agent

As one aspect of the oxidative color-developing leuco coloring agent, a compound having one or two hydrogen atoms, which develops color by removing electrons, is preferable. Examples of such an oxidative color-developing leuco coloring agent include (a) aminotriarylmethane, (b) aminoxanthine, (c) aminothioxanthine, (d) amino-9,10-dihydroacridine, (e) aminophenoxazine, (f) aminophenothiazine, (g) aminodihydrophenazine, (h) aminodiphenylmethane, (i) leuco indamine, (j) aminohydrocinnamic acid (cyanethane and leuco methine), (k) hydrazine, (l) leuco indigoid dye, (m) amino-2,3-dihydroanthraquinone, (n) tetrahalo-p,p'-biphenol, (o) 2-(p-hydroxyphenyl)-4,5-diphenylimidazole, and (p) phenethylaniline, which are described in U.S. Pat. No. 3,445,234A. Among the above-described (a) to (p), (a) to (i) develop color by losing one hydrogen atom, and (j) to (p) develop color by losing two hydrogen atoms.

Among these, aminoarylmethane is preferable, and aminotriarylmethane is more preferable.

As the aminotriarylmethane, a compound represented by Formula (L) or an acid salt thereof is preferable.

(L)

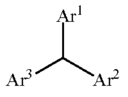

In the formula, $Ar^1$ represents a phenyl group having a $R^1R^2N$-substituent at a para position with respect to a bond to a methane carbon atom specified in the formula (carbon atom specified in the formula and bonded to $Ar^1$, $Ar^2$, and $Ar^3$). $Ar^2$ represents a phenyl group having a $R^1R^2N$-substituent at a para position with respect to a bond to a methane carbon atom specified in the formula or a phenyl group having, at an ortho position with respect to the methane carbon atom specified in the formula, a substituent selected from the group consisting of an alkyl group (preferably, an alkyl group having 1 to 4 carbon atoms), an alkoxy group (preferably, an alkoxy group having 1 to 4 carbon atoms), a fluorine atom, a chlorine atom, and a bromine atom. $R^1$ and $R^2$ each independently represent a hydrogen atom, an alkyl group having 1 to 10 carbon atoms, a 2-hydroxyethyl group, a 2-cyanoethyl group, or a benzyl group.

$Ar^3$ represents the same group as at least one of $Ar^1$ or $Ar^2$, or a group different from $Ar^1$ and $Ar^2$. In a case where $Ar^3$ represents a group different from $Ar^1$ and $Ar^2$, $Ar^3$ represents (B1) a phenyl group which may be substituted with a substituent selected from the group consisting of a lower alkyl group (preferably, an alkyl group having 1 to 4 carbon atoms), a lower alkoxy group (preferably, an alkoxy group having 1 to 4 carbon atoms), a chlorine atom, a diphenylamino group, a cyano group, a nitro group, a hydroxy group, a fluorine atom, a bromine atom, an alkylthio group, an arylthio group, a thioester group, an alkylsulfonic acid group, an arylsulfonic acid group, a sulfonic acid group, a sulfonamide group, an alkylamide group, and an arylamide group; (B2) a naphthyl group which may be substituted with a substituent selected from the group consisting of an amine group, a di-lower alkylamino group, and an alkylamino group; (B3) a pyridyl group which may be substituted with an alkyl group; (B4) a quinolyl group; or (B5) an indolinylidene group which may be substituted with an alkyl group.

In Formula (L), $R^1$ and $R^2$ are each independently preferably a hydrogen atom or an alkyl having 1 to 4 carbon atoms.

In addition, in Formula (L), it is preferable that all of $Ar^1$, $Ar^2$, and $Ar^3$ are the phenyl group having a $R^1R^2N$-substituent at a para position with respect to a bond to a methane carbon atom specified in the formula, and it is more preferable that all of $Ar^1$, $Ar^2$, and $Ar^3$ are the same group thereof.

Specific examples of the oxidative color-developing leuco coloring agent include tris(4-dimethylaminophenyl)methane, tris(4-diethylaminophenyl)methane, bis(4-diethylaminophenyl)-(4-diethylamino-2-methylphenyl)methane, bis(4-diethylamino-2-methylphenyl)-(4-diethylaminophenyl)methane, bis(1-ethyl-2-methylindol-3-yl)-phenylmethane, 2-N-(3-trifluoromethylphenyl)-N-ethylamino-6-diethylamino-9-(2-methoxycarbonylphenyl)xanthene, 2-(2-chlorophenyl)amino-6-dibutylamino-9-(2-methoxycarbonylphenyl)xanthene, 2-dibenzylamino-6-diethylamino-9-(2-methoxycarbonylphenyl)xanthene, benzo[a]-6-N,N-diethylamino-9,2-methoxycarbonylphenylxanthene, 2-(2-chlorophenyl)-amino-6-dibutylamino-9-(2-methylphenylcarboxamidophenyl)xanthene, 3,6-dimethoxy-9-(2-methoxycarbonyl)-phenylxanthene, benzoyl leuco methylene blue, and 3,7-bis-diethylamino-phenoxazine.

Acid Color-Developing Leuco Coloring Agent

As one aspect of the acid color-developing leuco coloring agent, a compound which develops color by donating electrons or receiving protons such as an acid is preferable. Specific examples thereof include a compound which has a partial skeleton such as a lactone (cyclic carboxylic acid ester), a lactam (cyclic carboxylic acid amide), a sultone (cyclic sulfonic acid ester), a sultine (cyclic sulfonic acid amide), a spiropyran, an ester, and an amide, in which these partial skeletons are ring-opened or cleaved upon contact with an acid or a proton.

From the viewpoint that it is easy to design the sensing layer, a compound having any one structure selected from the group consisting of a lactone ring, a lactam ring, a sultone ring, a sultine ring, a ring-opened body thereof, and an azobenzene structure (hereinafter, also referred to as "specific color-developing agent") is preferable.

The specific color-developing agent has a predetermined structure, and the structure can be reversibly changed.

For example, a specific color-developing agent X having the following lactone structure can be a ring-closed body which is substantially colorless and a ring-opened body which is colored. In a case where an acid is supplied to the ring-closed body of the specific color-developing agent X, as shown in the following scheme, a reaction in which the ring is opened by action of the acid ($H^+$) to produce a ring-opened body and a reaction in which the ring is closed by deacidification to produce a ring-closed body proceed reversibly, and higher amounts of the acid shift equilibrium biased more toward the reaction which produces the ring-opened body. As the equilibrium is biased to the reaction which produces the ring-opened body, color developability is enhanced, and the determination of the irradiation amount is easier. As will be described later, in a case where a mass ratio of a content of the photoactivator to a content of the color-developing agent (photoactivator/color-developing agent (mass ratio)) is more than 1.00, since the amount of acid generated with respect to the specific color-developing agent X increases, the equilibrium tends to be biased in the reaction from the ring-closed body to the ring-opened body, and as a result, the color developability is further enhanced. In addition, the amount of the color-developing agent can be relatively reduced in the mass ratio as described above, and in this case, absorption of light by the specific color-developing agent X itself can be suppressed, and as a result, light absorption by the photoactivator can be enhanced.

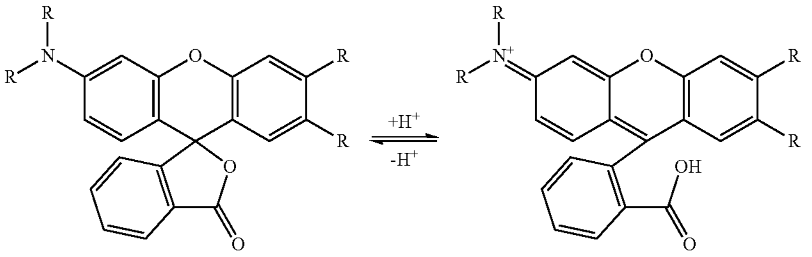

Although the aspect of the compound which is ring-opened by the action of acid has been described above, the compound which is ring-closed by the action of acid may also be used as described below.

As shown in the following scheme, a specific color-developing agent Y having the following sultone structure can be a ring-opened body exhibiting blue color and a ring-closed body exhibiting yellow color. In a case where an acid is supplied to the ring-opened body of the specific color-developing agent Y, as shown in the following scheme, a reaction in which the ring is closed by action of the acid ($H^+$) to produce a ring-closed body and a reaction in which the ring is opened by deacidification to produce a ring-opened body proceed reversibly, and higher amounts of the acid shift equilibrium more toward the reaction which produces the ring-closed body. As the equilibrium is biased to the reaction which produces the ring-closed body, the color developability is enhanced, and the determination of the irradiation amount is easier.

In a case where a compound described in the present specification has isomers (for example, a structural isomer, a stereoisomer, and the like), unless otherwise specified, the compound includes those isomers. For example, in a case of having "azobenzene structure", it means to include both the azobenzene structure and its tautomeric structure (for example, a hydrazone structure and the like). In addition, even in a compound represented by Formula (V) described later, unless otherwise specified, it is also intended to include a compound having a tautomeric structure of the compound represented by Formula (V).

Examples of the specific color-developing agent also include a compound represented by Formula (I-1), a compound represented by Formula (I-2), and a ring-opened compound of these compounds.

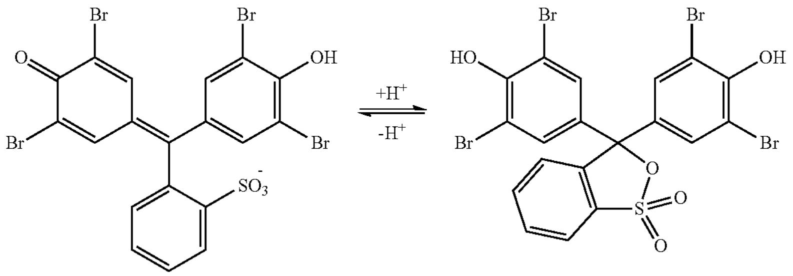

In addition, as shown in the following scheme, a specific color-developing agent Z having the following azobenzene structure can be an azo body exhibiting yellow color and a hydrazone body exhibiting orange to pink color. In a case where an acid is supplied to the azo body of the specific color-developing agent Z, as shown in the following scheme, a reaction in which the hydrazone body is produced by action of the acid ($H^+$) and a reaction in which the azo body is produced by deacidification proceed reversibly, and higher amounts of the acid shift equilibrium more toward the reaction which produces the hydrazone body. As the equilibrium is biased to the reaction which produces the hydrazone body, the color developability is enhanced, and the determination of the irradiation amount is easier.

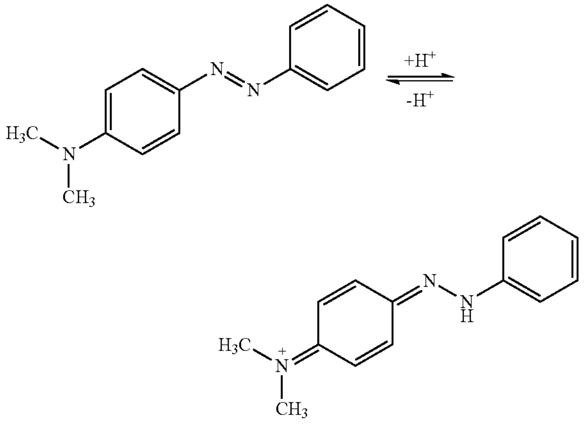

(I-1)

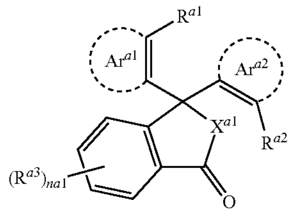

(I-2)

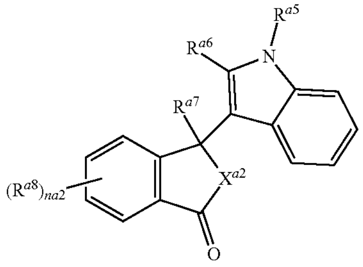

In Formula (I-1), $Ar^{a1}$ and $Ar^{a2}$ each independently represent an aromatic ring which may have a substituent. $R^{a1}$ and $R^{a2}$ each independently represent a hydrogen atom or an alkyl group which may have a substituent. $R^{a3}$ represents a substituent. $X^{a1}$ represents —O— or —$NR^{a4}$—. $R^{a4}$ represents a hydrogen atom, an alkyl group which may have a substituent, or an aryl group which may have a substituent. na1 represents an integer of 0 to 4.

$Ar^{a1}$ and $Ar^{a2}$ each independently represent an aromatic ring which may have a substituent. The above-described aromatic rings represented by $Ar^{a1}$ and $Ar^{a2}$ each include two carbon atoms (C═C) described in Formula (I-1).

The above-described aromatic ring which may have a substituent may be monocyclic or polycyclic.

Examples of the above-described aromatic ring which may have a substituent include an aromatic hydrocarbon ring which may have a substituent and an aromatic heterocyclic ring which may have a substituent, and an aromatic heterocyclic ring which may have a substituent is preferable.

Examples of the substituent which may be included in the above-described aromatic ring which may have a substituent include an alkyl group, an aryl group, and a heteroaryl group, and an alkyl group is preferable. The above-described group may further have a substituent.

The above-described alkyl group may be linear, branched, or cyclic, and is preferably linear or branched.

The number of carbon atoms in the above-described alkyl group is preferably 1 to 20 and more preferably 5 to 10.

The number of ring members in the above-described aromatic ring which may have a substituent is preferably 6 to 30, more preferably 6 to 18, and still more preferably 6 to 12.

Examples of the above-described aromatic ring which may have a substituent include aromatic hydrocarbon rings such as a benzene ring, a naphthalene ring, an anthracene ring, and a phenanthrene ring, which may have a substituent; and aromatic heterocyclic rings such as an indole ring, a pyrrole ring, a pyrazole ring, a triazole ring, a pyridine ring, a pyrazine ring, a pyrimidine ring, a pyridazine ring, a thiophene ring, a furan ring, a pyran ring, a thiazole ring, an oxazole ring, a selenophene ring, and an imidazole ring, which may have a substituent. Among these, an aromatic heterocyclic ring which may have a substituent is preferable, and an indole ring which may have a substituent is more preferable.

$Ar^{a1}$ and $Ar^{a2}$ may be the same group or different groups, and preferably represent the same group.

$R^{a1}$ and $R^{a2}$ each independently represent a hydrogen atom or an alkyl group which may have a substituent. Among these, $R^{a1}$ and $R^{a2}$ are preferably an alkyl group which may have a substituent.

The above-described alkyl group which may have a substituent may be linear, branched, or cyclic.

The number of carbon atoms in the above-described alkyl group which may have a substituent is preferably 1 to 10 and more preferably 1 to 3.

Examples of the substituent which may be included in the above-described alkyl group which may have a substituent include an aryl group and a heteroaryl group, and the above-described alkyl group is preferably an alkyl group having no substituent (unsubstituted alkyl group).

$R^{a3}$ represents a substituent.

Examples of the above-described substituent include a halogen atom, a cyano group, a nitro group, a carboxy group, an alkyl group, an aryl group, and a group obtained by combining these groups. In a case where a plurality of $R^{a3}$'s are present, the $R^{a3}$'s may be the same or different from each other.

na1 represents an integer of 0 to 4.

na1 is preferably an integer of 0 to 2, and more preferably 0. In other words, it is preferable that the compound represented by Formula (I-1) does not have $R^{a3}$.

$X^{a1}$ represents —O— or —$NR^{a4}$—. $R^{a4}$ represents a hydrogen atom, an alkyl group which may have a substituent, or an aryl group which may have a substituent.

$X^{a1}$ is preferably —O—.

Examples of the above-described alkyl group which may have a substituent include the above-described alkyl group which may have a substituent, represented by $R^{a1}$ and $R^{a2}$.

The above-described aryl group which may have a substituent may be monocyclic or polycyclic.

The number of carbon atoms in the above-described aryl group which may have a substituent is preferably 6 to 20.

Examples of the substituent which may be included in the above-described alkyl group which may have a substituent and the above-described aryl group which may have a substituent include the substituent represented by $R^{a3}$ described above.

In Formula (I-2), $R^{a5}$ and $R^{a6}$ each independently represent a hydrogen atom or an alkyl group which may have a substituent.

The number of carbon atoms in the alkyl group represented by $R^{a5}$ is not particularly limited, but is preferably 1 to 30, more preferably 1 to 20, still more preferably 1 to 12, and particularly preferably 5 to 10.

The number of carbon atoms in the alkyl group represented by $R^{a6}$ is not particularly limited, but is preferably 1 to 10, more preferably 1 to 5, and still more preferably 1 to 3.

Among these, as $R^{a5}$ and $R^{a6}$, an alkyl group which may have a substituent is preferable, and an unsubstituted alkyl group is more preferable.

$R^{a7}$ represents a hydrogen atom, an alkyl group which may have a substituent, or an aryl group which may have a substituent.

The number of carbon atoms in the alkyl group represented by $R^{a7}$ is not particularly limited, but is preferably 1 to 10 and more preferably 1 to 5.

The aryl group represented by $R^{a7}$ may have a monocyclic structure or a polycyclic structure.

$R^{a8}$ represents a substituent.

Examples of the above-described substituent include a halogen atom, a cyano group, a nitro group, a carboxy group, an alkyl group, an aryl group, and a group obtained by combining these groups. In a case where a plurality of $R^{a8}$'s are present, the $R^{a8}$'s may be the same or different from each other.

na2 represents an integer of 0 to 4.

na2 is preferably an integer of 0 to 2, and more preferably 0. In other words, it is preferable that the compound represented by Formula (I-2) does not have $R^{a8}$.

$X^{a2}$ represents —O— or —$NR^{a9}$—.

Among these, $X^{a2}$ is preferably —O—.

$R^{a9}$ represents a hydrogen atom, an alkyl group which may have a substituent, or an aryl group which may have a substituent.

The number of carbon atoms in the alkyl group represented by $R^{a9}$ is not particularly limited, but is preferably 1 to 10 and more preferably 1 to 5.

The aryl group represented by $R^{a9}$ may have a monocyclic structure or a polycyclic structure.

As the compound represented by Formula (I-1), a compound represented by Formula (IA) is preferable.

(IA)

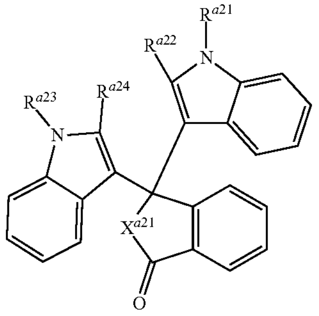

In Formula (IA), $R^{a22}$ and $R^{a24}$ each independently represent an alkyl group which may have a substituent. $R^{a21}$ and $R^{a23}$ each independently represent a hydrogen atom or an alkyl group which may have a substituent. $X^{a21}$ represents —O— or —$NR^{a25}$—. $R^{a25}$ represents a hydrogen atom, an alkyl group which may have a substituent, or an aryl group which may have a substituent.

$R^{a22}$ and $R^{a24}$ each independently represent an alkyl group which may have a substituent. $R^{a21}$ and $R^{a23}$ each independently represent a hydrogen atom or an alkyl group which may have a substituent.

Examples of the above-described alkyl group which may have a substituent include the alkyl group which may be included in the aromatic ring which may have a substituent, represented by $Ar^{a1}$ and $Ar^{a2}$. As $R^{a21}$ to $R^{a23}$, an alkyl group which may have a substituent is preferable, and an alkyl group having no substituent (unsubstituted alkyl group) is more preferable.

The alkyl group which may have a substituent, represented by $R^{a22}$ and $R^{a24}$, is the same as $R^{a1}$ and $R^{a2}$ described above, and a suitable range thereof is also the same.

$X^{a21}$ represents —O— or —$NR^{a25}$—. $R^{a25}$ represents a hydrogen atom, an alkyl group which may have a substituent, or an aryl group which may have a substituent.

$X^{a21}$ and $R^{a25}$ are the same as $X^{a1}$ and $R^{a4}$ described above, and suitable ranges thereof are also the same.

Examples of the specific color-developing agent also include a compound represented by Formula (II) and a ring-opened compound thereof.

(II)

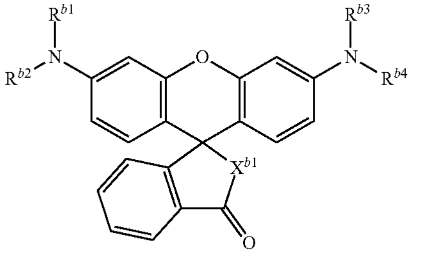

In Formula (II), $R^{b1}$ to $R^{b3}$ each independently represent a hydrogen atom, an alkyl group which may have a substituent, or an aryl group which may have a substituent. $R^{b2}$ and $R^{b4}$ each independently represent an alkyl group which may have a substituent or an aryl group which may have a substituent. $X^{b1}$ represents —$NR^{b5}$—. $R^{b5}$ represents a hydrogen atom, an alkyl group which may have a substituent, or an aryl group which may have a substituent.

The above-described alkyl group which may have a substituent, represented by $R^{b1}$ to $R^{b5}$, may be linear, branched, or cyclic, and is preferably linear or branched.

The number of carbon atoms in the above-described alkyl group which may have a substituent is preferably 1 to 10 and more preferably 1 to 5.

The above-described aryl group which may have a substituent, represented by $R^{b1}$ to $R^{b5}$, may be monocyclic or polycyclic.

The number of carbon atoms in the above-described aryl group which may have a substituent is preferably 6 to 20.

Examples of the substituent which may be included in the above-described alkyl group which may have a substituent and the above-described aryl group which may have a substituent include a halogen atom, a cyano group, a nitro group, a carboxy group, an alkyl group, an aryl group, and a group obtained by combining these groups.

As $R^{b1}$ to $R^{b4}$, an alkyl group which may have a substituent is preferable, and it is more preferable to have no substituent (unsubstituted alkyl group).

Examples of the specific color-developing agent also include a compound represented by Formula (III) and a ring-opened compound thereof.

(III)

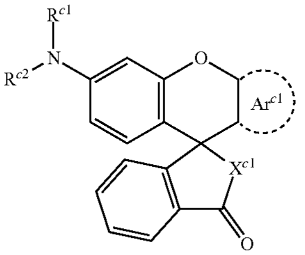

In Formula (III), $Ar^{c1}$ represents an aromatic ring which may have a substituent. $R^{c1}$ represents a hydrogen atom, an alkyl group which may have a substituent, or an aryl group which may have a substituent. $R^{c2}$ represents an alkyl group which may have a substituent or an aryl group which may have a substituent. $X^{c1}$ represents —O— or —$NR^{c3}$—. $R^{c3}$ represents a hydrogen atom, an alkyl group which may have a substituent, or an aryl group which may have a substituent.

$Ar^{c1}$ represents an aromatic ring which may have a substituent.

The above-described aromatic ring which may have a substituent may be monocyclic or polycyclic.

Examples of the above-described aromatic ring which may have a substituent include an aromatic hydrocarbon ring which may have a substituent and an aromatic heterocyclic ring which may have a substituent, and an aromatic hydrocarbon ring which may have a substituent is preferable.

Examples of the substituent which may be included in the above-described aromatic ring which may have a substituent include an alkyl group, —$NR^{N1}R^{N2}$, an aryl group, and a heteroaryl group, and an alkyl group or —$NR^{N1}R^{N2}$ is preferable. $R^{N1}$ and $R^{N2}$ each independently represent a hydrogen atom, an alkyl group which may have a substituent, or an aryl group which may have a substituent.

The above-described alkyl group may be linear, branched, or cyclic, and is preferably linear or branched.

The number of carbon atoms in the above-described alkyl group is preferably 1 to 20 and more preferably 1 to 5.

The number of ring members in the above-described aromatic ring which may have a substituent is preferably 6 to 30, more preferably 6 to 18, and still more preferably 6 to 12.

Examples of the above-described aromatic ring which may have a substituent include aromatic hydrocarbon rings such as a benzene ring, a naphthalene ring, an anthracene ring, and a phenanthrene ring, which may have a substituent; and aromatic heterocyclic rings such as an indole ring, a pyrrole ring, a pyrazole ring, a triazole ring, a pyridine ring, a pyrazine ring, a pyrimidine ring, a pyridazine ring, a thiophene ring, a furan ring, a pyran ring, a thiazole ring, an oxazole ring, a selenophene ring, and an imidazole ring, which may have a substituent. Among these, an aromatic hydrocarbon ring which may have a substituent is preferable, and a benzene ring which may have a substituent is more preferable.

$R^{c1}$ represents a hydrogen atom, an alkyl group which may have a substituent, or an aryl group which may have a substituent. $R^{c2}$ represents an alkyl group which may have a substituent or an aryl group which may have a substituent.

Examples of the alkyl group which may have a substituent and the aryl group which may have a substituent, which are represented by $R^{c1}$, include the alkyl group which may have a substituent and the aryl group which may have a substituent, which are represented by $R^{b1}$ to $R^{b5}$ described above.

As $R^{c1}$ and $R^{c2}$, a linear or branched alkyl group which does not have a substituent is preferable.

$X^{c1}$ represents —O— or —$NR^{c3}$—. $R^{c3}$ represents a hydrogen atom, an alkyl group which may have a substituent, or an aryl group which may have a substituent.

Examples of the alkyl group which may have a substituent and the aryl group which may have a substituent, which are represented by $R^{c3}$, include the alkyl group which may have a substituent and the aryl group which may have a substituent, which are represented by $R^{b1}$ to $R^{b5}$ described above.

Examples of the specific color-developing agent include a compound represented by Formula (IV) and a ring-closed compound thereof, and a compound represented by Formula (V).

(IV)

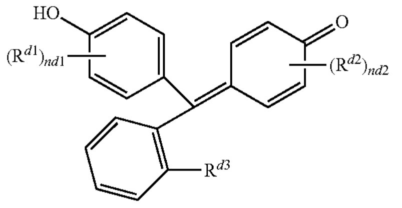

(V)

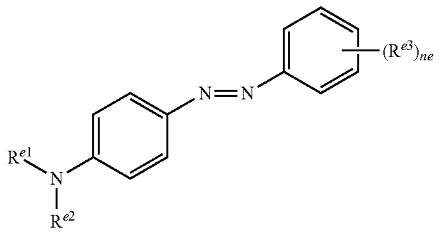

In Formula (IV), $R^{d1}$ and $R^{d2}$ each independently represent a halogen atom or an alkyl group which may have a substituent. $R^{d3}$ represents $COO^-M_d^+$ or $SO_3^-M_d^+$. $M_d^+$ represents a cation. nd1 and nd2 each independently represent an integer of 0 to 4.

In Formula (V), $R^{c1}$ and $R^{c2}$ each independently represent an alkyl group which may have a substituent. $R^{c3}$ represents $COO^-M_e^+$ or $SO_3^-M_e^+$. $M_e^+$ represents a cation. ne represents 0 or 1.

$R^{d1}$ and $R^{d2}$ each independently represent a halogen atom or an alkyl group which may have a substituent.

The above-described halogen atom is preferably a chlorine atom or a bromine atom.

The above-described alkyl group which may have a substituent may be linear, branched, or cyclic.

The number of carbon atoms in the above-described alkyl group which may have a substituent is usually 1 to 10.

$R^{d3}$ represents $COO^-M_d^+$ or $SO_3^-M_d^+$. $M_d^+$ represents a cation.

Examples of the above-described cation include known cations, and specific examples thereof include a monovalent cation such as $H^+$ (proton), a monovalent organic cation, and a monovalent inorganic cation, and $K^+$ or $Na^+$ is preferable.

nd1 and nd2 each independently represent an integer of 0 to 4.

nd1 and nd2 may be the same or different from each other, and preferably represent the same integer.

$R^{e1}$ and $R^{e2}$ each independently represent an alkyl group which may have a substituent.

Examples of $R^{e1}$ and $R^{e2}$ include the alkyl group which may have a substituent, represented by $R^{d1}$ and $R^{d2}$ described above.

$R^{e3}$ represents $COO^-M_e^+$ or $SO_3^-M_e^+$. $M_e^+$ represents a cation.

$M_e^+$ is the same as $M_d^+$, and a suitable aspect thereof is also the same.

ne represents 0 or 1.

Examples of the leuco coloring agent which develops color by the action of acid (acid color-developing leuco coloring agent) include 3,3-bis(2-methyl-1-octyl-3-indolyl) phthalide, 6'-(dibutylamino)-2'-bromo-3'-methylspiro [phthalide-3,9'-xanthene], 3-(4-diethylamino-2-ethoxyphenyl)-3-(1-ethyl-2-methylindol-3-yl)-4-azaphthalide, 3-(4-diethylamino-2-ethoxyphenyl)-3-(1-n-octyl-2-methylindol-3-yl)phthalide, 3-[2,2-bis(1-ethyl-2-methylindol-3-yl) vinyl]-3-(4-diethylaminophenyl)-phthalide, 2-anilino-6-dibutylamino-3-methylfluorane, 6-diethylamino-3-methyl-2-(2,6-xylidino)-fluorane, 2-(2-chloroanilino)-6-dibutylaminofluorane, 3,3-bis(4-dimethylaminophenyl)-6-dimethylaminophthalide, 2-anilino-6-diethylamino-3-methylfluorane, 9-[ethyl(3-methylbutyl)amino]spiro[12H-benzo[a]xanthene-12,1'(3'H)isobenzofuran]-3'-one, 2'-methyl-6'-(N-p-tolyl-N-ethylamino)spiro[isobenzofuran-1(3H),9'-[9H]xanthene]-3-one, 3',6'-bis(diethylamino)-2-(4-nitrophenyl)spiro[isoindole-1,9'-xanthene]-3-one, 9-(N-ethyl-N-isopentylamino)spiro[benzo[a]xanthene-12,3'-phthalide], 2'-anilino-6'-(N-ethyl-N-isopentylamino)-3'-methylspiro[phthalide-3,9'-[9H]xanthene], and 6'-(diethylamino)-1',3'-dimethylfluorane.

A content of the color-developing agent in the sensing layer is not particularly limited, but from the viewpoint that the effect of the present invention is more excellent, the content per unit area ($m^2$) of the sensing layer is preferably 0.01 to 2 $g/m^2$, more preferably 0.02 to 0.5 $g/m^2$, and still more preferably 0.02 to 0.1 $g/m^2$.

The above-described content of the color-developing agent can be calculated by cutting out an area having many sensing layers from the inspection tool, immersing the sensing layers in methanol for 2 days, and then analyzing the obtained solvent by liquid chromatography. The methanol is prevented from volatilizing during the immersion. As necessary, a calibration curve of the content of the color-developing agent to be detected may be created before the measurement of the liquid chromatography.

Measurement conditions of the liquid chromatography are as follows.

Equipment: Nexera manufactured by Shimadzu Corporation

Column: Capcell pak C18 UG-120

Eluent: water/methanol

Oven: 40° C.

Injection: 5 μL

Detection: maximal absorption wavelength of color-developing agent to be detected Flow Rate: 0.2 mL/min (Photoactivator)

The sensing layer preferably contains a photoactivator.

The photoactivator is not particularly limited as long as it is a compound which is activated by light, but the photoactivator activated by light preferably acts on the color-developing agent to develop color, and is preferably a compound activated by ultraviolet rays. The photoactivator is preferably any one or more of a photooxidant or a photoacid generator. In a case where the sensing layer contains the color-developing agent which develops color by being oxidized, the photoactivator preferably includes a photooxidant, and in a case where the sensing layer contains the color-developing agent which develops color by action of acid, the photoactivator preferably includes a photoacid generator.

The photoactivator may be used alone or in combination of two or more kinds thereof.

From the viewpoint that the effect of the present invention is more excellent, a mass ratio of a content of the photoactivator to a content of the color-developing agent (photoactivator/color-developing agent (mass ratio)) is preferably more than 1.00, more preferably 3.00 or more, still more preferably 8.00 or more, and particularly preferably 10.00 or more. The upper limit thereof is not particularly limited, but is preferably 40.00 or less, more preferably 30.00 or less, still more preferably 25.00 or less, and particularly preferably 20.00 or less.

The above-described mass ratio of the content of the photoactivator to the content of the color-developing agent can be measured by liquid chromatography after methanol extraction in the same manner as the above-described content of the color-developing agent. The photoactivator is detected at the maximal absorption wavelength of the photoactivator to be detected, the color-developing agent is detected at the maximal absorption wavelength of the color-developing agent to be detected, and the mass ratio thereof is obtained.

Photooxidant

The photooxidant is preferably a compound which can cause the developing of the color-developing agent by being activated by ultraviolet rays to generate a radical and/or exhibit an action of extracting the hydrogen atom of the color-developing agent.

Among these, the photooxidant is preferably one or more of a radical generator and an organic halogen compound. It is also preferable to use the radical generator and the organic halogen compound in combination as the photoacid generator. In a case where the radical generator and the organic halogen compound are used in combination, from the viewpoint that the color developability of the sensing layer is more excellent, a content ratio (radical generator/organic halogen compound (mass ratio)) of the radical generator to the organic halogen compound is preferably 0.1 to 10 and more preferably 0.5 to 5.

Radical Generator

The radical generator is not particularly limited as long as it is a compound which is activated by ultraviolet rays to generate a radical.

As the radical generator, a hydrogen-extracting radical generator is preferable. The hydrogen-extracting radical generator exhibits an action of extracting hydrogen atoms from the color-developing agent to promote the oxidation of the color-developing agent.

Examples of the radical generator include azide polymers described in The Lecture Summary, p. 55 for the Spring Meeting of the Society of Photographic Science and Technology of Japan, 1968; azide compounds described in U.S. Pat. No. 3,282,693A, such as 2-azidobenzoxazole, benzoylazide, and 2-azidobenzimidazole; compounds described in U.S. Pat. No. 3,615,568A, such as 3'-ethyl-1-methoxy-2-pyridothiacyanine perchlorate, 1-methoxy-2-methylpyridinium, and p-toluenesulfonate; lophine dimer compounds described in JP1987-039728B (JP-S62-039728B), such as a 2,4,5-triarylimidazole dimer; benzophenone; p-aminophenyl ketone; polynuclear quinone; and thioxanthene.

Among these, one or more selected from a lophine dimer and benzophenone is preferable, and a lophine dimer is more preferable.

Examples of the lophine dimer include a hexaarylbiimidazole compound. As the hexaarylbiimidazole-based compound, compounds described in paragraph 0047 of WO2016/017701A can be referred to, the contents of which are incorporated in the present specification.

Among these, 2,2'-bis(2-chlorophenyl)-4,4',5,5'-tetraphenyl-1,2'-biimidazole is preferable. As the 2,2'-bis(2-chlorophenyl)-4,4',5,5'-tetraphenyl-1,2'-biimidazole, for example, "B-IMD" (manufactured by KUROGANE KASEI Co., Ltd.) and "B-CIM" (manufactured by Hodogaya Chemical Co., Ltd.) can be used.

As the lophine dimer, a compound represented by General Formula (1) is also preferable.

(1)

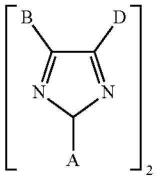

In the formula, A, B, and D each independently represent a carbocyclic or heteroaryl group, which is unsubstituted or substituted with a substituent which does not interfere with dissociation of the dimer to an imidazolyl group or the oxidation of the color-developing agent.

It is preferable that B and D are each independently unsubstituted or have 1 to 3 substituents, and it is preferable that A is unsubstituted or has 1 to 4 substituents.

As the compound represented by General Formula (1) and a method of preparing the compound, a finding known as the lophine dimer or the like can be utilized. For example, the description of column 4, line 22 and column 6, line 3 of U.S. Pat. No. 3,552,973A can be referred to, the contents of which are incorporated in the present specification.

The radical generator may be used alone or in combination of two or more kinds thereof.

Organic Halogen Compound

The organic halogen compound can promote the oxidation of the color-developing agent.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less. The organic halogen compound is a compound other than the lophine dimer and the benzophenone.

The organic halogen compound may be used alone or in combination of two or more kinds thereof.

Examples of the organic halogen compound include compounds represented by General Formulae (2) to (7).

$$P^0—CX_3 \quad (2)$$

In the formula, $P^0$ represents a hydrogen atom, a halogen atom, an alkyl group which may have a substituent, or an aryl group which may have a substituent. X's each independently represent a halogen atom.

Examples of the halogen atom represented by $P^0$ and X include a fluorine atom, a chlorine atom, a bromine atom, and an iodine atom, and a chlorine atom or a bromine atom is preferable.

Examples of the substituent which can be included in the alkyl group and aryl group represented by $P^0$ include a hydroxy group, a halogen atom, an alkyl group having 1 to 6 carbon atoms, a haloalkyl group having 1 to 6 carbon atoms, an acetyl group, and an alkoxy group having 1 to 6 carbon atoms.

Examples of the compound represented by General Formula (2) include trichloromethane, tribromomethane, carbon tetrachloride, carbon tetrabromide, p-nitrobenzotribromide, bromotrichloromethane, benzotrichloride, hexabromoethane, iodoform, 1,1,1-tribromo-2-methyl-2-propanol, 1,1,2,2-tetrabromoethane, 2,2,2-tribromoethanol, and 1,1,1-trichloro-2-methyl-2-propanol.

(3)

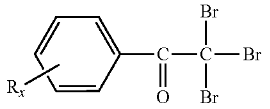

In the formula, R represents a substituent. x represents an integer of 0 to 5.

Examples of the substituent represented by R include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

In a case where a plurality of R's are present in the formula, the R's may be the same or different from each other.

x is preferably 0 to 3.

Examples of the compound represented by General Formula (3) include O-nitro-α,α,α-tribromoacetophenone, m-nitro-α,α,α-tribromoacetophenone, α,α,α-tribromoacetophenone, and p-nitro-α,α,α-tribromoacetophenone, α,α,α-tribromo-3,4-dichloroacetophenone.

$$R^1—SO_2—X^1 \quad (4)$$

In the formula, $R^1$ represents an alkyl group which may have a substituent or an aryl group which may have a substituent. $X^1$ represents a halogen atom.

As the alkyl group represented by $R^1$, an alkyl group having 1 to 20 carbon atoms is preferable, an alkyl group having 1 to 10 carbon atoms is more preferable, and an alkyl group having 1 to 6 carbon atoms is still more preferable.

As the aryl group represented by $R^1$, an aryl group having 6 to 20 carbon atoms is preferable, an aryl group having 6 to 14 carbon atoms is more preferable, and an aryl group having 6 to 10 carbon atoms is still more preferable.

Examples of the substituent which can be included in the alkyl group and aryl group represented by $R^1$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^1$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (4) include 2,4-dinitrobenzenesulfonyl chloride, o-nitrobenzenesulfonyl chloride, m-nitrobenzenesulfonyl chloride, 3,3'-diphenylsulfonedisulfonyl chloride, ethanesulfonyl chloride, p-bromobenzenesulfonyl chloride, p-nitrobenzenesulfonyl chloride, p-3-benzenesulfonyl chloride, p-acetamidobenzenesulfonyl chloride, p-chlorobenzenesulfonyl chloride, p-toluenesulfonyl chloride, methanesulfonyl chloride, and benzenesulfonyl bromide.

$$R^2—S—X^2 \quad (5)$$

In the formula, $R^2$ represents an alkyl group which may have a substituent or an aryl group which may have a substituent. $X^2$ represents a halogen atom.

The alkyl group which may have a substituent and the aryl group which may have a substituent, represented by $R^2$, are the same as those of $R^1$ in General Formula (4), and suitable aspects thereof are also the same.

Examples of the halogen atom represented by $X^2$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (5) include 2,4-dinitrobenzenesulfenyl chloride and o-nitrobenzenesulfenyl chloride.

$$R^3\text{-}L^1\text{-}CX^3X^4X^5 \quad (6)$$

In the formula, $R^3$ represents an aryl group which may have a substituent or a heteroaryl group which may have a substituent. $L^1$ represents —SO— or —$SO_2$—. $X^3$, $X^4$, and $X^5$ each independently represent a hydrogen atom or a halogen atom. However, all of $X^3$, $X^4$, and $X^5$ are not hydrogen atoms at the same time.

As the aryl group represented by $R^3$, an aryl group having 6 to 20 carbon atoms is preferable, an aryl group having 6 to 14 carbon atoms is more preferable, and an aryl group having 6 to 10 carbon atoms is still more preferable.

As the heteroaryl group represented by $R^3$, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the aryl group and heteroaryl group represented by $R^3$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^3$, $X^4$, and $X^5$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (6) include hexabromodimethyl sulfoxide, pentabromodimethyl sulfoxide, hexabromodimethylsulfone, trichloromethylphenylsulfone, tribromomethylphenylsulfone (BMPS), trichloro-p-chlorophenylsulfone, tribromomethyl-p-nitrophenylsulfone, 2-trichloromethylbenzothiazolesulfone, 4,6-dimethylpyrimidine-2-tribromomethylsulfone, tetrabromodimethylsulfone, 2,4-dichlorophenyl-trichloromethylsulfone, 2-methyl-4-chlorophenyltrichloromethylsulfone, 2,5-dimethyl-4-chlorophenyltrichloromethylsulfone, 2,4-dichlorophenyltrimethylsulfone, and tri-p-tolylsulfonium trifluoromethanesulfonate. Among these, trichloromethylphenylsulfone or tribromomethylphenylsulfone (BMPS) is preferable.

$$R^4CX^6X^7X^8 \quad (7)$$

In the formula, $R^4$ represents a heteroaryl group which may have a substituent. $X^6$, $X^7$, and $X^8$ each independently represent a hydrogen atom or a halogen atom. However, all of $X^6$, $X^7$, and $X^8$ are not hydrogen atoms at the same time.

As the heteroaryl group represented by $R^4$, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent which can be included in the heteroaryl group represented by $R^4$ include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^6$, $X^7$, and $X^8$ include a fluorine atom, a chlorine atom, a bromine atom, and an iodine atom, and a chlorine atom, a bromine atom, or an iodine atom is preferable and a chlorine atom or a bromine atom is more preferable.

Examples of the compound represented by General Formula (7) include tribromoquinaldine, 2-tribromomethyl-4-methylquinoline, 4-tribromomethylpyrimidine, 4-phenyl-6-tribromomethylpyrimidine, 2-trichloromethyl-6-nitrobenzothiazole, 1-phenyl-3-trichloromethylpyrazole, 2,5-ditribromomethyl-3,4-dibromothiophene, 2-trichloromethyl-3-(p-butoxystyryl)-1,3,4-oxadiazole, 2,6-didolychloromethyl-4-(p-methoxyphenyl)-triazine, and 2-(4-methylphenyl)-4,6-bis(trichloromethyl)-1,3,5-triazine.

Among these, as the organic halogen compound, the compound represented by General Formula (3), the compound represented by General Formula (6), or the compound represented by General Formula (7) is preferable, and from the viewpoint that the effect of the present invention is more excellent, the compound represented by General Formula (6) is more preferable.

As the halogen atom included in the above-described compound, a chlorine atom, a bromine atom, or an iodine atom is preferable, and a chlorine atom or a bromine atom is more preferable.

The organic halogen compound may be used alone or in combination of two or more kinds thereof.

Photoacid Generator

The photoacid generator is preferably a compound which is cleaved by ultraviolet rays to generate an acid and can cause the developing of the color-developing agent by the action of acid.

A molecular weight of the photoacid generator is not particularly limited, but is preferably 600 or less, more preferably 200 to 600, and still more preferably 300 to 500.

The acid generated from the photoacid generator may be an organic acid such as a carboxylic acid or an inorganic acid, and an inorganic acid is preferable.

Examples of the above-described inorganic acid include hydrogen halide, sulfonic acid, sulfuric acid, and nitric acid.

From the viewpoint that the effect of the present invention is more excellent, it is preferable that the photoacid generator is a compound which generates at least one acid selected from the group consisting of HBr, HI, $HPF_6$, $HSbF_6$, and perfluorosulfonic acid; it is more preferable that the photoacid generator is a compound which generates at least one acid selected from the group consisting of HBr and HI; and it is still more preferable that the photoacid generator is a compound generating HBr.

Examples of the photoacid generator include a non-ionic photoacid generator and an ionic photoacid generator, and from the viewpoint that the effect of the present invention is more excellent, a non-ionic photoacid generator is preferable.

Examples of the non-ionic photoacid generator include an organic halogen compound, an oxime compound, and a diazo compound, and among these, from the viewpoint that the effect of the present invention is more excellent, an organic halogen compound is preferable, and the compound represented by General Formula (6) described above is more preferable.

From the viewpoint that the gradation properties of the colored part are more excellent, the organic halogen compound is preferably a compound in which the number of halogen atoms in the molecule is 3 or more. The upper limit value of the number of halogen atoms is preferably 9 or less.

The organic halogen compound may be used alone or in combination of two or more kinds thereof.

Specific examples of the organic halogen compound include the same organic halogen compounds as those mentioned as the photooxidant in the upper part.

Examples of the oxime compound include (2-methyl-2-[(4-methylphenyl)sulfonyl]-1-[4-(methylthio)phenyl]-1-propanone).

Examples of the diazo compound include bis(t-butylsulfonyl)diazomethane, bis(cyclohexylsulfonyl)diazomethane, and bis(4-methylphenylsulfonyl)diazomethane.

Examples of the ionic photoacid generator include a diazonium salt, an iodonium salt, and a sulfonium salt; and an iodonium salt or a sulfonium salt is preferable and a triarylsulfonium salt is more preferable.

Examples of the ionic photoacid generator include compounds described in JP1987-161860A (JP-S62-161860A), JP1986-67034A (JP-S61-67034A), and JP1987-50382A (JP-S62-50382A), the contents of which are incorporated in the present specification.

Specific examples of the photoacid generator include triarylsulfonium hexafluorophosphate, triarylsulfonium arsenate, triarylsulfonium antimonate, diaryliodonium hexafluorophosphate, diaryliodonium arsenate, diaryliodonium antimonate, dialkylphenacylsulfonium tetrafluoroborate, dialkylphenacylsulfonium hexafluorophosphate, dialkyl-4-hydroxyphenylsulfonium tetrafluoroborate, dialkyl-4-hydroxyphenylsulfonium hexafluorophosphate, N-promosaccinimide, tribromomethylphenylsulfone, diphenyliodine, 2-trichloromethyl-5-(p-butoxystyryl)-1,3,4-oxadiazole, and 2,6-ditrichloromethyl-4-(p-methoxyphenyl)-triazine.

The photoactivator may be used alone or in combination of two or more kinds thereof.

A content of the photoactivator per unit area of the sensing layer is preferably 0.03 to 3 g/$m^2$, more preferably 0.05 to 1.5 g/$m^2$, and still more preferably 0.1 to 1 g/$m^2$.

The above-described content of the photoactivator can be measured using liquid chromatography by extracting the photoactivator in methanol in the same manner as in the method for measuring the above-described content of the color-developing agent. The above-described photoactivator is detected at the maximal absorption wavelength of the above-described photoactivator to be detected.

The sensing layer may contain a component other than the color-developing agent and the photoactivator.

(Light Stabilizer)

The sensing layer may contain a light stabilizer.

The light stabilizer may be any material which stabilizes with light, but it is preferably a light stabilizer which acts as a so-called free-radical scavenger, trapping free radicals of the activated photoactivator.

Examples of the light stabilizer include polyhydric phenols such as 2,5-bis(1,1,3,3-tetramethylbutyl)hydroquinone, hydroquinone, catechol, resorcinol, and hydroxyhydroquinone; aminophenols such as o-aminophenol and p-aminephenol.

The light stabilizer may be used alone or in combination of two or more kinds thereof.

A molar ratio of a content of the light stabilizer to the content of the photoactivator (content of light stabilizer/content of photoactivator (molar ratio)) is preferably 0.0001 to 10 and more preferably 0.0002 to 5.

(Ultraviolet Absorber)

The sensing layer may contain an ultraviolet absorber.

The ultraviolet absorber may be used alone or in combination of two or more kinds thereof.

Examples of the ultraviolet absorber include a benzotriazole compound having a benzotriazole structure, a benzophenone compound, a triazine compound, and a benzodithiol compound.

From the viewpoint that the sensitivity to the light having a wavelength of 222 nm and the light having a wavelength of 254 nm is more excellent, it is preferable that the ultraviolet absorber has a small absorption of the light having a wavelength of 222 nm and the light having a wavelength of 254 nm. As the ultraviolet absorber, a triazine compound, a benzophenone compound, or a benzodithiol compound is preferable.

In addition, it is preferable that the sensing layer does not contain a benzotriazole compound having a large absorption of the light having a wavelength of 222 nm and the light having a wavelength of 254 nm. In a case where the sensing layer contains a benzotriazole compound, a content of the benzotriazole compound is preferably 1% by mass or less, and more preferably 0.5% by mass or less with respect to the total mass of the photoactivator. The lower limit is often 0.0001% by mass or more. In addition, the content of the benzotriazole compound is preferably 1% by mass or less, and more preferably 0.5% by mass or less, with respect to the total mass of the photoactivator. The lower limit is often 0.0001% by mass or more.

Examples of the triazine compound include ADK STAB LA-F70 (manufactured by ADEKA Corporation); Tinuvin 1577 ED and Tinuvin 1600 (manufactured by BASF); 2,4-Bis(2,4-dimethylphenyl)-6-(2-hydroxy-4-n-octyloxyphenyl)-1,3,5-triazine, 2-(2,4-Dihydroxyphenyl)-4,6-diphenyl-1,3,5-triazine, and Ethylhexyl Triazone (manufactured by TOKYO CHEMICAL INDUSTRY CO., LTD.).

Examples of the benzophenone compound include Chimassorb 81 and Chimassorb 81 FL (manufactured by BASF).

Examples of the benzodithiol compound include compounds described in WO2019/159570A.

(Binder)

The sensing layer may contain a binder.

It is preferable that the above-described binder includes either a water-soluble binder resin or a water-insoluble binder resin.

Examples of the binder include cellulose resins such as methylcellulose, ethylcellulose, carboxymethylcellulose, and hydroxypropylcellulose, polyvinyl alcohol, polyvinyl butyral, gum arabic, gelatin, polyvinylpyrrolidone, casein, styrene-butadiene copolymer, acrylonitrile-butadiene copolymer, polyvinyl acetate, acrylic resin, polyvinyl chloride, and ethylene-vinyl acetate copolymer. From the viewpoint that the effect of the present invention is more excellent, the binder is preferably a binder having substantially no aromatic group, and more preferably a cellulose resin or an acrylic resin.

From the viewpoint that the effect of the present invention is more excellent, the binder is preferably a resin having a hydroxyl group. Examples of the resin having a hydroxyl group include the above-described cellulose resin, polyvinyl alcohol, and polyvinyl butyral.

From the viewpoint that it does not develop color without irradiation and has excellent storage stability, it is preferable that the binder has a low acid value. Specifically, it is preferably 0 to 50 mgKOH/g, and more preferably 0 to 20 mgKOH/g. In addition, examples of the binder include binders described in paragraph 0078 of JP2017-167155A, the contents of which are incorporated in the present specification.

The binder may be used alone or in combination of two or more kinds thereof.

The binder may be crosslinked. In other words, the binder may be a crosslinked binder.

A crosslinking agent is not particularly limited, and for example, glyoxazole can be used. In addition, a crosslinking agent described in paragraph 0079 of JP2017-167155A can also be referred to. The contents thereof are incorporated in the present specification.

It is preferable that the binder has substantially no aromatic ring because excessive absorption of light having a wavelength of 222 nm is suppressed. The "substantially no aromatic ring" means that a content of the aromatic ring is preferably 0% to 1% by mass and more preferably 0% to 0.1% by mass with respect to the total mass of the binder.

(Surfactant)

The sensing layer may contain a surfactant.

The surfactant is preferably an anionic or non-ionic surfactant, and examples thereof include alkylbenzenesulfonates (such as sodium dodecylbenzenesulfonate and ammonium dodecylbenzenesulfonate), alkylsulfonates (such as sodium lauryl sulfate and dioctyl sodium sulfosuccinate), polyalkylene glycols (such as polyoxyethylene nonylphenyl ether).

(Other Components)

The sensing layer may contain, as necessary, at least one additive selected from the group consisting of a colorant, a wax, and the like, in addition to the above-described components.

The color of the colorant can be controlled by using the colorant in combination with the color-developing agent.

Examples of the colorant include a dye and a pigment. Examples of the pigment include yellow pigments described in paragraphs 0018 to 0022 of WO2016/017701A and inorganic particles such as a white pigment.

In the above, an aspect in which the sensing layer contains the color-developing agent and the photoactivator has been described, but the configuration of the sensing layer is not limited to the above aspect. Examples thereof include an embodiment of containing a microcapsule which contains a color-developing agent and a photoactivator. Examples of the color-developing agent and the photoactivator contained in the microcapsule include the same types as those in the above-described embodiment, and a suitable aspect thereof is also the same. An additive other than the color-developing agent and the photoactivator may be contained in the microcapsule, or may be outside the microcapsule. The microcapsule may further contain a binder outside the microcapsule. Examples of the binder and other additives include the above-described compounds. The color-developing agent and the photoactivator are preferably encapsulated in the microcapsule.

(Method for Forming Sensing Layer)

Examples of a method for forming the sensing layer include known methods.

Examples thereof include a method of applying a composition for forming a sensing layer onto a support, and as necessary, drying the coating film.

The composition for forming a sensing layer may contain a color-developing agent, a photoactivator, and other components as necessary, in addition to the above-described components.

The composition for forming a sensing layer may contain a solvent. Examples of the solvent include water and an organic solvent.

Examples of the method of applying the composition for forming a sensing layer include, as a coating machine used for the applying, an air knife coater, a rod coater, a bar coater, a curtain coater, a gravure coater, an extrusion coater, a die coater, a slide bead coater, and a blade coater.

After the composition for forming a sensing layer is applied onto the support, the coating film may be subjected to a drying treatment, as necessary. Examples of the drying treatment include a blower treatment and a heating treatment.

The method of forming the sensing layer on the support has been described above, but the present invention is not limited to the above-described aspect, and for example, a sensing layer having self-supporting properties may be formed by forming the sensing layer on a temporary support and then peeling off the temporary support.

The temporary support is not particularly limited as long as it is a peelable support.

A mass (coating amount of solid content) per unit area of the sensing layer is not particularly limited, but for example, is preferably 0.1 to 30 $g/m^2$, more preferably 0.5 to 25 $g/m^2$, and still more preferably 1 to 10 $g/m^2$.

A thickness of the sensing layer is preferably 0.1 to 30 μm, more preferably 0.5 to 25 μm, and still more preferably 1 to 10 μm.

<Transparent Layer>

The reference portion in the inspection tool includes a transparent layer. The transparent layer is disposed on the sensing layer, and the light having a wavelength of 222 nm, the light having a wavelength of 254 nm, and the sunlight are emitted from a side where the transparent layer is disposed.

The transparent layer satisfies a relationship of Expressions (1) and (2).

$$0\% \leq TMA_{200\ to\ 254} < 15.0\% \quad \text{Expression (1)}$$

$$50.0\% < TMI_{360\ to\ 800} \leq 100\% \quad \text{Expression (2)}$$

In Expression (1), $TMA_{200\ to\ 254}$ represents the maximum transmittance of the transparent layer in a wavelength range of 200 to 254 nm.

In Expression (2), $TMI_{360\ to\ 800}$ represents the minimum transmittance of the transparent layer in a wavelength range of 360 to 800 nm.

Among these, from the viewpoint that the effect of the present invention is more excellent, $TMA_{200\ to\ 254}$ is preferably 0% to 10.0% and more preferably 0% to 5.0%.

In addition, from the viewpoint that the effect of the present invention is more excellent, $TMI_{360\ to\ 800}$ is preferably 60.0% to 100% and more preferably 70.0% to 100%.

As described above, in a case where $TMA_{200\ to\ 254}$ is within the above-described range, the sensing layer in the reference portion is prevented from being irradiated with the light having a wavelength of 222 nm and the light having a wavelength of 254 nm.

In addition, in a case where $TMI_{360\ to\ 800}$ is within the above-described range, the sensing layer in the reference portion is irradiated with the sunlight, and the transparent layer itself suppresses the tint.

From the viewpoint that the change in tint of the sensing layer in the reference portion is easily discriminated, $TMI_{400\ to\ 800}$ is preferably 80.0% to 100%.

$TMI_{400\ to\ 800}$ represents the minimum transmittance of the transparent layer in a wavelength range of 400 to 800 nm.

In addition, from the viewpoint that the effect of the present invention is more excellent, $TMI_{360\ to\ 400}$ is preferably 50.0% to 100%, more preferably 60.0% to 100%, still more preferably 70.0% to 100%, and particularly preferably 80.0% to 100%.

$TMI_{360\ to\ 400}$ represents the minimum transmittance of the transparent layer in a wavelength range of 360 to 400 nm.

An average transmittance of the transparent layer in a wavelength range of 254 to 360 nm is not particularly limited, but from the viewpoint that the effect of the present invention is more excellent, it is preferably 10.0% to 60.0% and more preferably 20.0% to 50.0%.

A transmittance of the transparent layer at a wavelength of 365 nm is not particularly limited, but from the viewpoint that the effect of the present invention is more excellent, it is preferably 50.0% to 100% and more preferably 70.0% to 100%.

The above-described various transmittances of the transparent layer can be measured using UV2700 manufactured by Shimadzu Corporation.

A material constituting the transparent layer is not particularly limited as long as it satisfies the above-described characteristics, and may be an organic substance or an inorganic substance. Among these, from the viewpoint of handleability, a resin is preferable. That is, the transparent layer is preferably a resin layer (layer containing a resin).

The type of the resin contained in the transparent layer is not particularly limited, and examples thereof include aromatic polyester, polystyrene, a (meth)acrylic resin, aromatic polyurethane, aromatic polyurethane urea, aromatic polyurea, polyolefin, polyacetyl cellulose, a cellulose resin, polyvinylpyrrolidone, polyvinyl alcohol, polyvinyl butyral, polyvinyl chloride, and polyacetoacetate. From the viewpoint that it is easy to exhibit the above-described characteristics, aromatic polyester, polystyrene, a (meth)acrylic resin, aromatic polyurethane, aromatic polyurethane urea, or aromatic polyurea is preferable.

A content of the resin contained in the transparent layer is not particularly limited, but from the viewpoint of handleability or the like, it is preferably 90% to 100% by mass and more preferably 95% to 100% by mass with respect to the total mass of the transparent layer. The transparent layer may contain other components in addition to the resin.

The transparent layer may contain an ultraviolet absorber. Examples of the ultraviolet absorber include the compounds exemplified as the ultraviolet absorber which may be contained in the above-described sensing layer (for example, a benzotriazole compound, a benzophenone compound, a triazine compound, and a benzodithiol compound).

The transparent layer may contain an ultraviolet-C absorber. The ultraviolet-C absorber is a compound which absorbs ultraviolet C waves (light having a wavelength of 100 to 280 nm) and does not absorb ultraviolet B waves (light having a wavelength of 280 to 320 nm) and ultraviolet A waves (light having a wavelength of 320 to 400 nm).

Examples of the above-described ultraviolet-C absorber include urocanic acid, L-histidine, prednisone, and 1,2-diphenylethene.

The transparent layer may have a monolayer structure or a multilayer structure. In a case where the transparent layer has a multilayer structure, for example, the transparent layer may have a multilayer structure of a first layer containing a resin and not containing an ultraviolet absorber, and a second layer containing an ultraviolet absorber.

From the viewpoint that the effect of the present invention is more excellent, it is preferable that the transparent layer satisfies at least one of the following requirement A or the following requirement B.

Requirement A: a content of an ultraviolet absorber contained in the transparent layer is 0% to 1% by mass with respect to the total mass of the transparent layer Requirement B: in a case where the transparent layer has a multilayer structure and includes a layer containing an ultraviolet absorber, a content of the ultraviolet absorber contained in the layer containing an ultraviolet absorber is 1% by mass or less A thickness of the transparent layer is not particularly limited, but from the viewpoint that the effect of the present invention is more excellent, it is preferably 5 to 250 μm and more preferably 25 to 100 μm.

Examples of a method for forming the transparent layer include known methods.

Examples thereof include a method of applying a composition for forming a transparent layer onto a sensing layer, and as necessary, drying the coating film. In addition, a transparent layer produced separately may be bonded to the sensing layer.

<Other Layers>

The inspection tool may include a layer other than the above-described members (the support, the sensing layer, and the transparent layer).

(Reflective Layer)

The inspection tool may further include a reflective layer. In a case where the sensing portion includes the reflective layer, it is preferable that the reflective layer is disposed between the support and the sensing layer. In a case where the reference portion includes the reflective layer, it is preferable that the reflective layer is disposed between the support and the sensing layer or between the sensing layer and the transparent layer.

In a case where the inspection tool includes the reflective layer, scattering of the ultraviolet rays inside the inspection tool can be suppressed, and the accuracy of detecting the amount of ultraviolet irradiation in the inspection tool can be further improved.

A reflectivity of the reflective layer with respect to light having a wavelength of 180 to 380 nm is preferably 10% to 100%, and more preferably 50% to 100%. The reflectivity can be measured, for example, by diffusion reflection measurement using an ultraviolet-visible spectrophotometer (UV-2700, manufactured by Shimadzu Corporation).

In a case where the support is disposed adjacent to the reflective layer, an adhesive layer may be provided between the support and the reflective layer.

Examples of the reflective layer, the adhesive layer, and manufacturing methods thereof include the reflective layer, the adhesive layer, and manufacturing methods thereof, which are described in paragraphs 0082 to 0091 of WO2016/017701A, the contents of which are incorporated in the present specification.

(Glossy Layer)

The inspection tool may further include a glossy layer.

In a case where the inspection tool includes a glossy layer, visibility of front and back surfaces can be improved. In a case where the sensing portion includes the glossy layer, it is preferable that the glossy layer is disposed between the support and the sensing layer. In a case where the reference portion includes the glossy layer, it is preferable that the glossy layer is disposed between the support and the sensing layer or between the sensing layer and the transparent layer.

Examples of the glossy layer and a method for producing the glossy layer include glossy layers and method for producing the glossy layer, described in paragraphs 0092 to 0094 of WO2016/017701A, the contents of which are incorporated in the present specification.

<Characteristics of Inspection Tool>

The inspection tool according to the embodiment of the present invention includes the above-described sensing portion and reference portion.

It is preferable that the inspection tool satisfies the following requirement X, in terms of the characteristic of the sensing portion.

Requirement X: in a case where, using a KrCl excimer lamp as a light source, the sensing portion is irradiated with light through a filter which substantially shields light having a wavelength of 230 to 300 nm until an irradiation amount of light having a wavelength of 222 nm reaches 5 $mJ/cm^2$, a color difference ΔE between before the light irradiation and after the light irradiation is 20.0 or more.

Hereinafter, the requirement X will be described in detail.

First, using a KrCl excimer lamp as a light source, the sensing portion is irradiated with light through a filter which substantially shields light having a wavelength of 230 to 300 nm until an irradiation amount of light having a wavelength of 222 nm reaches 5 $mJ/cm^2$. From the viewpoint of easy handling, a size of the sensing portion to be irradiated with light is preferably a size of a length of 5 mm to 10 m in a vertical direction and a length of 5 mm to 1 m in a horizontal direction, and more preferably a size of a length of 10 mm to 200 mm in the vertical direction and a length of 10 mm to 200 mm in the horizontal direction.

The filter which substantially shields light having a wavelength of 230 to 300 nm means a filter which shields 70% to 100% of the light having a wavelength of 230 to 300 nm. In other words, the above-described filter is a filter having a maximum transmittance of 30% or less in the wavelength range of 230 to 300 nm. As such a filter, a chemical filter or a filter containing a dielectric is usually used.

As an ultraviolet irradiation device in which the KrCl excimer lamp is used as the light source and the filter which substantially shields light having a wavelength of 230 to 300 nm is provided, an ultraviolet irradiation device Care 222 (registered trademark) available from Ushio Inc. may be used. In the Care 222 (registered trademark), a lamp in which a main wavelength is ultraviolet rays with a wavelength of 222 nm, which is suitable for sterilization, is combined with a filter that limits light to a wavelength range (wavelength of 200 to 230 nm) which is harmless to the human body. Therefore, in a case where light irradiation is performed using the Care 222 (registered trademark), light having a wavelength of 222 nm is mainly irradiated.

Illuminance and irradiation time in the case of the irradiation are not particularly limited, and the irradiation amount can be set to 5 $mJ/cm^2$ by adjusting a distance between the light source and the sensing portion and the irradiation time.

In addition, using a known ultraviolet-measuring device (for example, Handheld Light Meter UIT2400 (manufactured by Ushio America, Inc.), it may be measured whether or not a predetermined irradiation amount has been applied to the sensing portion.

Next, a color difference ΔE between the sensing portion before the light irradiation and the sensing portion after the light irradiation is measured.

More specifically, in a case of using the spectrophotometer Spectrolino (GretagMacbeth AG), measurement conditions are set as follows.

Irradiation type: D65

Observation field: 2°

Density standard: ANSI STATUS A

Using the above-described spectrophotometer, the sensing portion before the light irradiation and the sensing portion after the light irradiation are set as objects to be measured, and a lightness L*, a chromaticity a*, and a chromaticity b* defined by the CIE1976L*a*b* color system are measured. It is preferable that the measurement of the lightness L*, chromaticity a*, and chromaticity b* of the sensing portion after the light irradiation is carried out within 1 hour after the light irradiation.

Next, ΔL* which is a difference between the lightness L* of the sensing portion before the light irradiation (hereinafter, also referred to as "lightness L*1") and the lightness L* of the sensing portion after the light irradiation (hereinafter, also referred to as "lightness L*2"), Δa* which is a difference between the chromaticity a* of the sensing portion before the light irradiation (hereinafter, also referred to as "chromaticity a*1") and the chromaticity a* of the sensing portion after the light irradiation (hereinafter, also referred to as "chromaticity a*2"), and Δb* which is a difference between the chromaticity b* of the sensing portion before the light irradiation (hereinafter, also referred to as "chromaticity b*1") and the chromaticity b* of the sensing portion after the light irradiation (hereinafter, also referred to as "chromaticity b*2") are obtained, and the color difference ΔE is calculated from the following expression.

$$\Delta E=\{(\Delta L^*)^2+(\Delta a^*)^2+(\Delta b^*)^2\}^{1/2}$$

The color difference ΔE is preferably 20.0 or more, and from the viewpoint that the effect of the present invention is more excellent, it is more preferably 24.0 to 130 and still more preferably 35.0 to 100.

The difference between the lightness L*1 and the lightness L*2 is a value obtained by subtracting the smaller one of the lightness L*1 and the lightness L*2 from the larger one thereof. In a case where the values of the lightness L*1 and the lightness L*2 are the same, the difference between the two is 0.

In addition, the difference between the chromaticity a*1 and the chromaticity a*2 is a value obtained by subtracting the smaller one of the chromaticity a*1 and the chromaticity a*2 from the larger one thereof. In a case where the values of the chromaticity a*1 and the chromaticity a*2 are the same, the difference between the two is 0.

In addition, the difference between the chromaticity b*1 and the chromaticity b*2 is a value obtained by subtracting the smaller one of the chromaticity b*1 and the chromaticity b*2 from the larger one thereof. In a case where the values of the chromaticity b*1 and the chromaticity b*2 are the same, the difference between the two is 0.

A form of the inspection tool may be a sheet-like shape, and various shapes such as a block shape, for example, a rectangular parallelepiped shape, a cylindrical shape, and the like can be used. Among these, a sheet-like inspection tool, that is, an inspection sheet is suitably used.

In addition, as the shape of the sheet-like inspection tool, various shapes such as a square shape, a rectangular shape, a circular shape, an elliptical shape, a polygonal shape other than a quadrangular shape, for example, a hexagonal shape and the like, and an amorphous shape can be used. In addition, the sheet-like inspection tool may include a long shape.

The inspection tool may include other members. In a case where the inspection tool has other members, the inspection tool may be attached to the other members through an adhesive layer (for example, a pressure sensitive adhesive, an adhesive, and the like), or the ultraviolet inspection tool may be manufactured as a part of other members. Examples of the other members include a business card, a name tag, a mask, a cloth product (for example, a shirt), a case (for example, a smartphone case), and a paper product (for example, a notebook, a calendar, and the like).

<Inspection Method>

By using the inspection tool according to the embodiment of the present invention, it is possible to easily confirm whether or not the light having a wavelength of 222 nm and the light having a wavelength of 254 nm are emitted. More specifically, as described above, the inspection tool is placed in a predetermined environment (for example, under sunlight), and the color difference between the sensing portion and the reference portion is observed, whereby it can be discriminated whether or not the light having a wavelength of 222 nm and the light having a wavelength of 254 nm are emitted.

EXAMPLES

Hereinafter, the features of the present invention will be more specifically described using Examples and Comparative Examples. The materials, the amounts of materials used, the proportions, the treatment details, the treatment procedure, and the like shown in Examples below may be modified as appropriate as long as the modifications do not depart from the spirit of the present invention. Accordingly, the scope of the present invention should not be construed as being limited by the specific examples given below.

Example 1

A mixed solution 1 having the following composition was added to a 5% by mass aqueous solution (202 parts by mass) of polyvinyl alcohol, and then emulsified and dispersed at 20° ° C. to obtain an emulsified liquid having a volume average particle size of 1 μm. Further, the obtained emulsified liquid was continuously stirred at 50° C. for 4 hours. Further, water was added thereto to adjust the concentration of solid contents, thereby obtaining a 16.4% by mass of microcapsule liquid containing a color-developing agent.

(Composition of Mixed Solution 1)

Color-developing agent: 3,3-bis(2-methyl-1-octyl-3-indolyl)phthalide (manufactured by BASF) 2.6 parts by mass Acid generator: BMPS, tribromomethylphenylsulfone (manufactured by SUMITOMO SEIKA CHEMICALS CO., LTD.) 10 parts by mass Microcapsule-contained solvent: TCP, tricresyl phosphate (manufactured by DAIHACHI CHEMICAL INDUSTRY CO., LTD.) 23 parts by mass Solvent for producing microcapsule: ethyl acetate (manufactured by SHOWA DENKO K.K.) 50 parts by mass Light stabilizer: 2,5-bis(1,1,3,3-tetramethylbutyl)hydroquinone (manufactured by TOKYO CHEMICAL INDUSTRY CO., LTD.) 0.03 parts by mass Microcapsule wall forming material: D-110 N ("TAKENATE D-110N", manufactured by Mitsui Chemicals, Inc., 75% by mass ethyl acetate solution) 8 parts by mass The obtained microcapsule dispersion liquid (20 parts by mass), a 6% by mass aqueous solution of polyvinyl alcohol (product name "Denka Size EP-130", manufactured by Denka Company Limited.) (5 parts by mass), glyoxal (manufactured by Daito Chemical Co., Ltd.) (0.05 parts by mass), and a 50% by mass aqueous solution of sodium dodecylbenzenesulfonate (manufactured by DKS Co. Ltd.) (0.09 parts by mass) were mixed with each other to produce a composition for forming a sensing layer.

The obtained composition for forming a sensing layer was applied onto a support of a white polyethylene terephthalate sheet ("CRISPER K1212", manufactured by Toyobo Co., Ltd.) having a thickness of 188 μm with an amount of liquid applied of 21 mL/$m^2$, and then heated and dried at 105° for 1 minute to produce an inspection tool including the support and the sensing layer. A coating amount of solid content of the sensing layer was 3 g/$m^2$ per unit area of the sensing layer, and a thickness of the sensing layer was 3 μm.

Next, a polyethylene terephthalate (PET) film (manufactured by Toyobo Co., Ltd., COSMOSHINE A4360, thickness: 50 μm) was prepared, and bonded to half of the surface of the sensing layer to produce an inspection tool 1 (see FIG. 1). A region where the PET film was bonded corresponds to the reference portion, and a region where the PET film was not bonded corresponds to the sensing portion.

Examples 2 to 6

Inspection tools 2 to 6 of Examples 2 to 6 were produced by the same method as in Example 1, except that the PET film was changed to the film shown in Table 1.

The film of Example 4 was produced as follows.

Ethyl acetate (25 parts by mass) and BURNOCK D-750N (trimethylolpropane adduct of tolylene diisocyanate, DIC Corporation, 75% by weight ethyl acetate solution) (10 parts by mass) were mixed with each other, and the obtained solution was applied onto a 60 μm-thick TAC film (FUJITAC Z-TAC, manufactured by FUJIFILM Corporation) such that a thickness of a coating film was 1 μm.

The obtained coating film was immersed in hot water at 85° C. for 3 hours for crosslinking.

Example 7

An inspection tool 7 was produced according to the same procedure as in Example 1, except that the concentration of solid contents of the microcapsule liquid encompassing the color-developing agent was changed from 16.4% by mass to 21.2% by mass.

Example 8

Polyvinyl butyral (solid content: 100% by mass) (50 parts by mass), tetrahydrofuran (300 parts by mass), and ethanol (68.2 parts by mass) were mixed to dissolve polyvinyl butyral. Tribromomethylphenylsulfone (manufactured by SUMITOMO SEIKA CHEMICALS CO., LTD.) (10.0 parts by mass) and 3,3-bis(2-methyl-1-octyl-3-indolyl)phthalide (manufactured by BASF) (5.0 parts by mass) were added to the obtained polyvinyl butyral solution and dissolved. The obtained composition for forming a sensing layer was applied onto a white polyethylene terephthalate sheet (product name "CRISPER K1212", manufactured by Toyobo Co., Ltd.) having a thickness of 188 μm so that a film thickness after drying was 5 μm, and then dried to form a sensing layer.

Next, the same PET film as in Example 1 was prepared, and bonded to half of the surface of the sensing layer to produce an inspection tool 8 (see FIG. 1). A region where the PET film was bonded corresponds to the reference portion, and a region where the PET film was not bonded corresponds to the sensing portion.

Example 9

A mixed solution 2 having the following composition was added to a 5% by mass aqueous solution (202 parts by mass) of polyvinyl alcohol, and then emulsified and dispersed at 20° ° C. to obtain an emulsified liquid having a volume average particle size of 1 μm. Further, the obtained emulsified liquid was continuously stirred at 50° C. for 8 hours. Thereafter, the emulsified liquid was returned to room temperature, and filtered to obtain an aqueous capsule dispersion liquid.

(Composition of Mixed Solution 2)

Color-developing agent: LEUCO CRYSTAL VIOLET (product name "LCV",
manufactured by Yamada Chemical Co., Ltd.) 2.5 parts by mass Organic halogen compound: tribromomethylphenylsulfone (BMPS, manufactured by
SUMITOMO SEIKA CHEMICALS CO., LTD.) 1.25 parts by mass Aromatic solvent 1: tricresyl phosphate (manufactured by DAIHACHI CHEMICAL
INDUSTRY CO., LTD.) 23 parts by mass Aromatic solvent 2: phenylxylylethane (product name "Nisseki Hisol SAS296",
manufactured by JX Nippon Oil and Energy Corp) 7 parts by mass Non-aromatic solvent: ethyl acetate (manufactured by SHOWA DENKO K.K.) 50 parts by mass Light stabilizer: 2,5-bis(1,1,3,3-tetramethylbutyl)hydroquinone (BTHQ, manufactured by TOKYO CHEMICAL INDUSTRY CO., LTD.) 3 parts by mass Capsule wall material: polyisocyanate (product name "TAKENATE D-110N", manufactured by Mitsui Chemicals, Inc., adduct of xylylene-1,3-diisocyanate and trimethylolpropane, 75% by mass ethyl acetate solution) 31 parts by mass The obtained capsule dispersion liquid (20 parts by mass), a 6% by mass aqueous solution of polyvinyl alcohol (product name "Denka Size EP-130", manufactured by Denka Company Limited.) (5 parts by mass), glyoxal (manufactured by Daito Chemical Co., Ltd.) (0.04 parts by mass), and a 50% by mass aqueous solution of sodium dodecylbenzenesulfonate (manufactured by DKS Co. Ltd.) (0.09 parts by mass) were mixed with each other to produce a composition for forming a sensing layer.

The obtained composition for forming a sensing layer was applied onto a white polyethylene terephthalate sheet (product name "CRISPER K1212", manufactured by Toyobo Co., Ltd.) having a thickness of 75 μm such that the amount of solid content applied was 20 g/m$^2$, and the applied composition was heated and dried at 105° C. for 1 minute to form a sensing layer. The thickness of the sensing layer was approximately 20 μm.

Next, the same PET film as in Example 1 was prepared, and bonded to half of the surface of the sensing layer to produce an inspection tool 9 (see FIG. 1). A region where the PET film was bonded corresponds to the reference portion, and a region where the PET film was not bonded corresponds to the sensing portion.

Example 10

The same PET film as in Example 1 was prepared, and bonded to half of the surface of the sensing layer of a commercially available UV label (S type, manufactured by NiGK Corporation) to produce an inspection tool 10 (see FIG. 1). A region where the PET film was bonded corresponds to the reference portion, and a region where the PET film was not bonded corresponds to the sensing portion.

Example 11

An inspection tool 11 was produced according to the same procedure as in Example 10, except that a commercially available UV scale (L type, manufactured by FUJIFILM Corporation) was used instead of the UV label (S type, manufactured by NiGK Corporation).

Example 12

An inspection tool 12 was produced according to the same procedure as in Example 11, except that the film shown in Table 1 was used instead of the PET film.

Comparative Example 1

An ultraviolet-sensing sheet (corresponding to an inspection tool C1) was produced according to the procedure of Example 1 of WO2016/017701A.

The produced ultraviolet-sensing sheet did not include the reference portion.

Comparative Examples 2 to 5

Inspection tools C2 to C5 were produced according to the same procedure as in Example 11, except that the film shown in Table 1 was used instead of the PET film.

In the inspection tools produced in Examples, the sensing layer in the sensing portion and the sensing layer in the reference portion were layers which caused a visual change (color development) before and after irradiation with light having a wavelength of 200 to 254 nm and before and after irradiation with light having a wavelength of 360 to 400 nm.

<Evaluation>

(Measurement of Color Difference ΔE at Wavelength of 222 nm)

In an environment in which sunlight did not enter, using Care222 (registered trademark), the support of the inspection tool produced in each of Examples and Comparative Examples was irradiated with light having a wavelength of 222 nm from a side opposite to the support under conditions of an average illuminance of 28 μW, 3 minutes (180 seconds), and an irradiation amount of 5 mJ/cm$^2$.

Thereafter, using a spectrophotometer Spectrolino (GretagMacbeth AG), under the conditions of irradiation type: D65, observation visual field: 2°, and density standard: ANSI STATUS A, the color difference ΔE between the sensing portion before the light irradiation and the sensing portion after the light irradiation and the color difference ΔE between the sensing portion before the light irradiation and the reference portion after the light irradiation were measured.

(Measurement of Color Difference ΔE at Wavelength of 254 nm)

In an environment in which sunlight did not enter, using a handy UV lamp SLUV-8 (AS ONE Corporation), the support of the inspection tool produced in each of Examples and Comparative Examples was irradiated with light having a wavelength of 254 nm from a side opposite to the support under conditions of an average illuminance of 28 μW and 3 minutes (180 seconds) until the irradiation amount reached 5 mJ/cm$^2$.

Thereafter, the color difference ΔE between the sensing portion before the light irradiation and the sensing portion after the light irradiation and the color difference ΔE between the sensing portion before the light irradiation and the reference portion after the light irradiation were measured in the same manner as in the ΔE measurement at a wavelength of 222 nm.

(Measurement of Color Difference ΔE at Wavelength of 365 nm)

In an environment in which sunlight did not enter, using a handy UV lamp SLUV-8 (AS ONE Corporation), the support of the inspection tool produced in each of Examples was irradiated with light having a wavelength of 365 nm from a side opposite to the support under conditions of an average illuminance of 67 μW and 5 minutes (300 seconds) until the irradiation amount reached 20 mJ/cm$^2$.

Thereafter, the color difference ΔE between the sensing portion before the light irradiation and the sensing portion after the light irradiation and the color difference ΔE between the sensing portion before the light irradiation and the reference portion after the light irradiation were measured in the same manner as in the ΔE measurement at a wavelength of 222 nm.

(Visual Evaluation 1)

In a room having a window with a blind on a sunny day (in an environment in which sunlight entered), the same ΔE measurement as described above, a 222 nm-irradiation test, and a 254 nm-irradiation test were performed. However, the average illuminance was adjusted to 1.4 μW and the exposure time was adjusted to 1 hour (3,600 seconds), so that the exposure amount was adjusted to 5 mJ/cm$^2$.

Thereafter, the difference in density between the sensing portion and the reference portion was visually evaluated according to the following standard.

A: difference in density between the sensing portion and the reference portion was clearly visible.

B: difference in density between the sensing portion and the reference portion was not clear, but the sensing portion and the reference portion could be distinguished.

C: difference in density between the sensing portion and the reference portion could be distinguished, but it was difficult to distinguish therebetween.

D: there was no difference in density between the sensing portion and the reference portion, and thus the sensing portion and the reference portion could not be distinguished from each other.

In Comparative Example 1, since there was no portion corresponding to the reference portion and the entire surface was colored, the influence of the sunlight could not be excluded, and thus the evaluation was described as "-".

(Visual Evaluation 2)

In addition, in a case where the inspection tool was allowed to stand for 1 hour in a room having a window with a blind on a sunny day (in an environment in which sunlight entered), a difference in density between the sensing portion and the reference portion was visually evaluated according to the following standard.

A: there was no difference in density between the sensing portion and the reference portion.

B: there was a difference in density between the sensing portion and the reference portion.

In Comparative Example 1, since there was no portion corresponding to the reference portion and the entire surface was colored, the influence of the sunlight could not be excluded, and thus the evaluation was described as "-".

The fact that the difference in density occurred between the sensing portion and the reference portion in the above-described visual evaluation 2 means that the difference in density occurred due to the sunlight, not due to the light having a wavelength of 222 nm and the light having a wavelength of 254 nm. Therefore, using such an inspection tool, in a case where the sensing portion was irradiated with the light having a wavelength of 222 nm or the light having a wavelength of 254 nm under a condition of being irradiated with the sunlight, even in a case where the difference in density occurred between the sensing portion and the reference portion, it was not possible to discriminate whether the difference in density occurred by the light having a wavelength of 222 nm or the light having a wavelength of 254 nm, or the difference in density occurred by the sunlight.

Therefore, it can be said that the effect of the present invention is obtained in a case where the visual evaluation 1 was an evaluation of A to C and the visual evaluation 2 was an evaluation of A.

The transparent layers used in Table 1 are as follows.

PET film 1: polyethylene terephthalate (PET) film (manufactured by Toyobo Co., Ltd., COSMOSHINE A4360, thickness: 50 μm); the film contained an aromatic polyester.

Vinyl chloride film 1: manufactured by ACHILLES CORPORATION, agricultural film for lining, thickness: 50 μm; the film contained a polyvinyl chloride.

D750 coating film: a composition containing BURNOCK D-750N (trimethylolpropane adduct of tolylene diisocyanate, DIC Corporation, 75% by mass ethyl acetate solution) was applied onto a glass plate, the obtained coated glass plate was immersed in hot water at 85° C. for 3 hours to crosslink the coating film, and the obtained coating film was peeled off from the glass plate, thereby obtaining a D750 coating film; the coating film contained an aromatic polyurethane urea.

TAC+D750 coating film: film including the TAC film and a coating film formed of a composition containing BURNOCK D-750N (trimethylolpropane adduct of tolylene diisocyanate, DIC Corporation, 75% by weight ethyl acetate solution), which were produced by the above-described procedures; the coating film contained an aromatic polyurethane urea.

Polystyrene film: manufactured by OHISHI SANGYO CO., LTD., Styrofan GL, thickness: 50 μm; the film contained a polystyrene.

PMMA film: manufactured by Mitsubishi Chemical Corporation., ACRYPLEN HBS006H, thickness: 53 μm; the film contained a polymethyl methacrylate.

PET film 2: manufactured by NEION Film Coatings Corp., TL-16-L800-KG2, thickness: 16 μm; the film contained an aromatic polyester and an ultraviolet absorber; and the film was used by peeling off the release paper for bonding.

Polyethylene film: manufactured by Tamapoly CO., LTD., Sealant PE film UH-1, thickness: 40 μm; the film contained a polyethylene.

Vinyl chloride film 2: vinyl chloride film.

Tack film: FUJITAC Z-TAC, manufactured by FUJIFILM Corporation, thickness: 60 μm; the film contained a triacetyl cellulose.

In the column of "Sensing layer" in the column of "Reference portion" in Table 1, "A1" indicates a sensing layer containing the microcapsule containing the predetermined color-developing agent used in Examples 1 to 6; "A2" indicates a sensing layer containing the microcapsule containing the color-developing agent at a concentration different from that in the sensing layer indicated by A1, used in Example 7; "B1" indicates a sensing layer containing the predetermined color-developing agent and not containing the microcapsule, used in Example 8; "C1" indicates a sensing layer containing the microcapsule containing LEUCO CRYSTAL VIOLET, used in Example 9; "C2" indicates a sensing layer used in Example 1 of WO2016/017701A, used in Comparative Example; "UV label" indicates the commercially available UV label; and "UV scale" indicates the commercially available UV scale.

In Table 1, the column of "$TMA_{200\ to\ 254}$" indicates the maximum transmittance (%) of the transparent layer in a wavelength range of 200 to 254 nm.

In Table 1, the column of "$TA_{254\ to\ 360}$" indicates the average transmittance (%) of the transparent layer in a wavelength range of 254 to 360 nm.

In Table 1, "$TMI_{360\ to\ 800}$" indicates the minimum transmittance (%) of the transparent layer in a wavelength range of 360 to 800 nm.

In Table 1, the column of "$T_{365}$" indicates the transmittance (%) of the transparent layer at a wavelength of 365 nm.

TABLE 1

| | Reference portion | | | | | | ΔE before and after irradiation 222 nm | |
|---|---|---|---|---|---|---|---|---|
| | Sensing | Transparent layer | | | | | Sensing | Reference |
| | layer | Type | $TMA_{200\ to\ 254}$ | $TA_{254\ to\ 360}$ | $TMI_{360\ to\ 800}$ | $T_{365}$ | portion | portion |
| Example 1 | A1 | PET film 1 | 0.0 | 29.6 | 80.0 | 81.2 | 50 | 0 |
| Example 2 | A1 | Vinyl chloride film | 0.0 | 20.7 | 54.8 | 59.4 | 50 | 0 |

TABLE 1-continued

| | | | | | | | | |
|---|---|---|---|---|---|---|---|---|
| Example 3 | A1 | D750 coating film | 0.0 | 26.8 | 80.6 | 85.6 | 50 | 0 |
| Example 4 | A1 | TAC + D750 | 0.0 | 23.1 | 81.3 | 89.0 | 50 | 0 |
| Example 5 | A1 | Polystyrene film | 0.0 | 42.3 | 70.2 | 88.0 | 50 | 0 |
| Example 6 | A1 | PMMA film | 10.0 | 56.0 | 90.0 | 87.0 | 50 | 0 |
| Example 7 | A2 | PET film 1 | 0.0 | 29.6 | 80.0 | 81.2 | 39 | 0 |
| Example 8 | B1 | PET film 1 | 0.0 | 29.6 | 80.0 | 81.2 | 40 | 0 |
| Example 9 | C1 | PET film 1 | 0.0 | 29.6 | 80.0 | 81.2 | 6 | 0 |
| Example 10 | UV label | PET film 1 | 0.0 | 29.6 | 80.0 | 81.2 | 24 | 0 |
| Example 11 | UV scale | PET film 1 | 0.0 | 29.6 | 80.0 | 81.2 | 6 | 0 |
| Example 12 | UV scale | Vinyl chloride film | 0.0 | 20.7 | 54.8 | 59.4 | 6 | 0 |
| Comparative Example 1 | C2 | — | — | — | — | — | 6 | 0 |
| Comparative Example 2 | UV scale | PET film 2 | 0.0 | 0.0 | 0.0 | 0.0 | 6 | 0 |
| Comparative Example 3 | UV scale | Polyethylene film | 87.5 | 88.8 | 88.6 | 89.8 | 6 | 6 |
| Comparative Example 4 | UV scale | Vinyl chloride film 2 | 87.7 | 87.4 | 84.6 | 89.7 | 6 | 6 |
| Comparative Example 5 | UV scale | TAC film | 82.2 | 87.6 | 90.4 | 90.6 | 6 | 6 |

| | ΔE before and after irradiation | | | | Evaluation | | |
|---|---|---|---|---|---|---|---|
| | 254 nm | | 365 nm | | Visual evaluation 1 | | |
| | Sensing portion | Reference portion | Sensing portion | Reference portion | 222 nm-irradiation test | 254 nm-irradiation test | Visual evaluation 2 |
| Example 1 | 55 | 0 | 12 | 11 | A | A | A |
| Example 2 | 55 | 0 | 12 | 9 | A | A | A |
| Example 3 | 55 | 0 | 12 | 11 | A | A | A |
| Example 4 | 55 | 0 | 12 | 11 | A | A | A |
| Example 5 | 55 | 0 | 12 | 11 | A | A | A |
| Example 6 | 55 | 0 | 12 | 11 | A | A | A |
| Example 7 | 53 | 0 | 12 | 11 | A | A | A |
| Example 8 | 53 | 0 | 12 | 11 | A | A | A |
| Example 9 | 11 | 0 | 6 | 5 | C | B | A |
| Example 10 | 23 | 0 | 6 | 5 | A | A | A |
| Example 11 | 11 | 0 | 6 | 5 | C | B | A |
| Example 12 | 11 | 0 | 6 | 4 | C | B | A |
| Comparative Example 1 | 11 | 0 | 6 | 0 | — | — | — |
| Comparative Example 2 | 11 | 0 | 6 | 0 | A | A | B |
| Comparative Example 3 | 11 | 11 | 6 | 5 | D | D | A |
| Comparative Example 4 | 11 | 11 | 6 | 5 | D | D | A |
| Comparative Example 5 | 11 | 11 | 6 | 5 | D | D | A |

As shown in Table 1, desired effects were obtained by using the inspection tool according to the embodiment of the present invention.

Explanation of References

10: inspection tool
12: support
14: sensing layer
16: transparent layer
18: sensing portion
20: reference portion

What is claimed is:

1. An inspection tool comprising:

a sensing portion; and a reference portion, wherein the sensing portion includes a sensing layer which senses at least light having a wavelength of 200 to 254 nm, the reference portion includes the sensing layer and a transparent layer, and the transparent layer satisfies a relationship of Expressions (1) and (2), $$0\% \leq TMA_{200\ to\ 254} < 15.0\% \qquad \text{Expression (1)}$$

$$50.0\% < TMI_{360\ to\ 800} \leq 100\% \qquad \text{Expression (2)}$$

in Expression (1), $TMA_{200\ to\ 254}$ represents a maximum transmittance of the transparent layer in a wavelength range of 200 to 254 nm, in Expression (2), $TMI_{360\ to\ 800}$ represents a minimum transmittance of the transparent layer in a wavelength range of 360 to 800 nm.

2. The inspection tool according to claim 1, wherein the inspection tool has a sheet shape.

3. The inspection tool according to claim 2, wherein the transparent layer is a resin layer.

4. The inspection tool according to claim 2, wherein the transparent layer contains a resin selected from the group consisting of an aromatic polyester, a polystyrene, a (meth)acrylic resin, an aromatic polyurethane, an aromatic polyurethane urea, and an aromatic polyurea.

5. The inspection tool according to claim 2, wherein the transparent layer contains an ultraviolet-C absorber and a resin, and the resin includes a resin selected from the group consisting of an aromatic polyester, a polystyrene, a (meth) acrylic resin, an aromatic polyurethane, an aromatic polyurethane urea, an aromatic polyurea, a polyolefin, a polyacetyl cellulose, a cellulose resin, a polyvinylpyrrolidone, a polyvinyl alcohol, a polyvinyl butyral, a polyvinyl chloride, and a polyacetoacetate.

6. The inspection tool according to claim 2, wherein the transparent layer satisfies at least one of a requirement A or a requirement B, the requirement A: a content of an ultraviolet absorber contained in the transparent layer is 0% to 1% by mass with respect to a total mass of the transparent layer, the requirement B: in a case where the transparent layer has a multilayer structure and includes a layer containing an ultraviolet absorber, a content of the ultraviolet absorber contained in the layer containing an ultraviolet absorber is 1% by mass or less.

7. The inspection tool according to claim 2, wherein, in a case where, using a KrCl excimer lamp as a light source, the sensing portion is irradiated with light through a filter which substantially shields light having a wavelength of 230 to 300 nm until an irradiation amount of light having a wavelength of 222 nm reaches 5 mJ/cm$^2$, a color difference ΔE between before the light irradiation and after the light irradiation is 20.0 or more.

8. The inspection tool according to claim 2, wherein the sensing layer contains a color-developing agent and a photoactivator.

9. The inspection tool according to claim 8, wherein the color-developing agent includes any one structure selected from the group consisting of a lactone ring, a lactam ring, a sultone ring, a sultine ring, a ring-opened body of these rings, and an azobenzene structure.

10. The inspection tool according to claim 8, wherein the sensing layer contains a compound represented by General Formula (6), $$R^3\text{-}L^1\text{-}CX^3X^4X^5 \quad (6)$$

in General Formula (6), $R^3$ represents an aryl group which may have a substituent or a heteroaryl group which may have a substituent, $L^1$ represents —SO— or —$SO_2$—, and $X^3$, $X^4$, and $X^5$ each independently represent a hydrogen atom or a halogen atom, where all of $X^3$, $X^4$, and $X^5$ are not hydrogen atoms at the same time.

11. An inspection method using the inspection tool according to claim 2.

12. The inspection tool according to claim 1, wherein the transparent layer is a resin layer.

13. The inspection tool according to claim 1, wherein the transparent layer contains a resin selected from the group consisting of an aromatic polyester, a polystyrene, a (meth)acrylic resin, an aromatic polyurethane, an aromatic polyurethane urea, and an aromatic polyurea.

14. The inspection tool according to claim 1, wherein the transparent layer contains an ultraviolet-C absorber and a resin, and the resin includes a resin selected from the group consisting of an aromatic polyester, a polystyrene, a (meth) acrylic resin, an aromatic polyurethane, an aromatic polyurethane urea, an aromatic polyurea, a polyolefin, a polyacetyl cellulose, a cellulose resin, a polyvinylpyrrolidone, a polyvinyl alcohol, a polyvinyl butyral, a polyvinyl chloride, and a polyacetoacetate.

15. The inspection tool according to claim 1, wherein the transparent layer satisfies at least one of a requirement A or a requirement B, the requirement A: a content of an ultraviolet absorber contained in the transparent layer is 0% to 1% by mass with respect to a total mass of the transparent layer, the requirement B: in a case where the transparent layer has a multilayer structure and includes a layer containing an ultraviolet absorber, a content of the ultraviolet absorber contained in the layer containing an ultraviolet absorber is 1% by mass or less.

16. The inspection tool according to claim 1, wherein, in a case where, using a KrCl excimer lamp as a light source, the sensing portion is irradiated with light through a filter which substantially shields light having a wavelength of 230 to 300 nm until an irradiation amount of light having a wavelength of 222 nm reaches 5 mJ/cm$^2$, a color difference ΔE between before the light irradiation and after the light irradiation is 20.0 or more.

17. The inspection tool according to claim 1, wherein the sensing layer contains a color-developing agent and a photoactivator.

18. The inspection tool according to claim 17, wherein the color-developing agent includes any one structure selected from the group consisting of a lactone ring, a lactam ring, a sultone ring, a sultine ring, a ring-opened body of these rings, and an azobenzene structure.

19. The inspection tool according to claim 17, wherein the sensing layer contains a compound represented by General Formula (6), $$R^3\text{-}L^1\text{-}CX^3X^4X^5 \quad (6)$$

in General Formula (6), $R^3$ represents an aryl group which may have a substituent or a heteroaryl group which may have a substituent, $L^1$ represents —SO— or —$SO_2$—, and $X^3$, $X^4$, and $X^5$ each independently represent a hydrogen atom or a halogen atom, where all of $X^3$, $X^4$, and $X^5$ are not hydrogen atoms at the same time.

20. An inspection method using the inspection tool according to claim 1.

* * * * *